United States Patent
Adams et al.

(10) Patent No.: US 7,743,214 B2
(45) Date of Patent: Jun. 22, 2010

(54) GENERATING STORAGE SYSTEM COMMANDS

(76) Inventors: Mark Adams, 2132 Baxter St., Los Angeles, CA (US) 90039; Thomas Earl Ludwig, 4800 Camino Costado, San Clemente, CA (US) 92673; Samuel K. Baughman, 750 Las Palmas Dr., Irvine, CA (US) 92602; Nicholas J. Witchey, 24832 Hon Ave., Laguna Hills, CA (US) 92653; Nauzad Sadry, 3801 Parkview La., Apt. 7A, Irvine, CA (US) 92612

( * ) Notice: Subject to any disclaimer, the term of this patent is extended or adjusted under 35 U.S.C. 154(b) by 153 days.

(21) Appl. No.: 11/472,198

(22) Filed: Jun. 20, 2006

(65) Prior Publication Data

US 2007/0168396 A1  Jul. 19, 2007

Related U.S. Application Data

(63) Continuation-in-part of application No. 11/205,895, filed on Aug. 16, 2005.

(51) Int. Cl.
  *G06F 13/00* (2006.01)
  *G06F 13/28* (2006.01)
(52) U.S. Cl. .................... 711/117; 711/170
(58) Field of Classification Search ............. 711/117, 711/170
  See application file for complete search history.

(56) References Cited

U.S. PATENT DOCUMENTS

| | | | |
|---|---|---|---|
| 4,890,227 A | 12/1989 | Watanabe et al. | |
| 5,129,088 A | 7/1992 | Auslander et al. | |
| 5,193,171 A | 3/1993 | Shinmura et al. | |
| 5,506,969 A | 4/1996 | Wall et al. | |
| 5,546,541 A | 8/1996 | Drew et al. | |
| 5,590,124 A | 12/1996 | Robins | |
| 5,590,276 A | 12/1996 | Andrews | |
| 5,634,111 A | 5/1997 | Oeda et al. | |
| 5,696,934 A * | 12/1997 | Jacobson et al. | 714/5 |
| 5,742,604 A | 4/1998 | Edsall et al. | |
| 5,758,050 A * | 5/1998 | Brady et al. | 714/1 |
| 5,758,188 A | 5/1998 | Appelbaum et al. | |

(Continued)

FOREIGN PATENT DOCUMENTS

EP  0485110  5/1992

(Continued)

OTHER PUBLICATIONS

RAID, section 6.1, http://en.wikipedia.org/wiki/RAID.*

(Continued)

*Primary Examiner*—Matt Kim
*Assistant Examiner*—Edward J Dudek
(74) *Attorney, Agent, or Firm*—Schwabe, Williamson & Wyatt, P.C.

(57) ABSTRACT

Systems and methods for generating storage system commands are presented. Logical volumes comprise one or more storage areas. The methods include providing a map of the logical volume from information relating to the types of the storage areas composing the volume. Storage commands referencing the logical volume map are converted to storage area commands by command handlers associated with the type of the storage areas in the logical volume. The storage system comprises clients that access the storage areas by using a command stacks associated with the logical volumes.

28 Claims, 10 Drawing Sheets

U.S. PATENT DOCUMENTS

| | | |
|---|---|---|
| 5,867,686 A | 2/1999 | Conner et al. |
| 5,884,038 A | 3/1999 | Kapoor |
| 5,889,935 A | 3/1999 | Ofek et al. |
| 5,930,786 A | 7/1999 | Carino, Jr. et al. |
| 5,937,169 A | 8/1999 | Connery et al. |
| 5,948,062 A | 9/1999 | Tzelnic |
| 5,949,977 A | 9/1999 | Hernandez |
| 5,991,891 A | 11/1999 | Hahn et al. |
| 6,018,779 A | 1/2000 | Blumenau |
| 6,081,879 A | 6/2000 | Arnott |
| 6,101,559 A | 8/2000 | Schultz et al. |
| 6,105,122 A | 8/2000 | Muller et al. |
| 6,128,664 A | 10/2000 | Yanagidate et al. |
| 6,157,935 A | 12/2000 | Tran et al. |
| 6,157,955 A | 12/2000 | Narad et al. |
| 6,181,927 B1 | 1/2001 | Welling et al. |
| 6,202,060 B1 | 3/2001 | Tran |
| 6,246,683 B1 | 6/2001 | Connery et al. |
| 6,253,273 B1 | 6/2001 | Blumenau |
| 6,275,898 B1 | 8/2001 | Dekoning |
| 6,288,716 B1 | 9/2001 | Humpleman et al. |
| 6,295,584 B1 | 9/2001 | DeSota et al. |
| 6,330,236 B1 | 12/2001 | Ofek et al. |
| 6,330,615 B1 | 12/2001 | Gioquindo et al. |
| 6,385,638 B1 | 5/2002 | Baker-Harvey |
| 6,389,448 B1 | 5/2002 | Primak |
| 6,396,480 B1 | 5/2002 | Schindler |
| 6,401,183 B1 | 6/2002 | Rafizadeh |
| 6,434,683 B1 | 8/2002 | West et al. |
| 6,449,607 B1 | 9/2002 | Tomita et al. |
| 6,466,571 B1 | 10/2002 | Dynarski et al. |
| 6,470,342 B1 | 10/2002 | Gondi et al. |
| 6,473,774 B1 | 10/2002 | Cellis et al. |
| 6,480,934 B1 | 11/2002 | Hino et al. |
| 6,487,555 B1 | 11/2002 | Bharat et al. |
| 6,549,983 B1 | 4/2003 | Han et al. |
| 6,567,863 B1 | 5/2003 | Lafuite et al. |
| 6,601,101 B1 | 7/2003 | Lee et al. |
| 6,601,135 B1 | 7/2003 | McBrearty et al. |
| 6,618,743 B1 | 9/2003 | Bennett |
| 6,629,264 B1 | 9/2003 | Sicola et al. |
| 6,681,244 B1 | 1/2004 | Cross et al. |
| 6,693,912 B1 | 2/2004 | Wang |
| 6,701,431 B2 | 3/2004 | Subramanian et al. |
| 6,701,432 B1 | 3/2004 | Deng et al. |
| 6,710,786 B1 | 3/2004 | Jacobs et al. |
| 6,711,164 B1 | 3/2004 | Le et al. |
| 6,732,171 B2 | 5/2004 | Hayden |
| 6,732,230 B1 | 5/2004 | Johnson et al. |
| 6,741,554 B2 | 5/2004 | D'Amico et al. |
| 6,754,662 B1 | 6/2004 | Li |
| 6,757,845 B2 | 6/2004 | Bruce |
| 6,772,161 B2 | 8/2004 | Mahalingam et al. |
| 6,775,672 B2 | 8/2004 | Mahalingam et al. |
| 6,775,673 B2 | 8/2004 | Mahalingam et al. |
| 6,795,534 B2 | 9/2004 | Noguchi |
| 6,799,244 B2 | 9/2004 | Tanaka et al. |
| 6,799,255 B1 | 9/2004 | Blumenau et al. |
| 6,834,326 B1 | 12/2004 | Wang et al. |
| 6,853,382 B1 | 2/2005 | Van Dyke et al. |
| 6,854,021 B1 | 2/2005 | Schmidt et al. |
| 6,862,606 B1 | 3/2005 | Major et al. |
| 6,876,657 B1 | 4/2005 | Palmer et al. |
| 6,886,035 B2 | 4/2005 | Wolff |
| 6,894,976 B1 | 5/2005 | Banga et al. |
| 6,895,461 B1 | 5/2005 | Thompson |
| 6,895,511 B1 | 5/2005 | Borsato et al. |
| 6,901,497 B2 | 5/2005 | Tashiro et al. |
| 6,904,470 B1 | 6/2005 | Ofer et al. |
| 6,907,473 B1 | 6/2005 | Schmidt et al. |
| 6,912,622 B2 | 6/2005 | Miller |
| 6,917,616 B1 | 7/2005 | Normand et al. |
| 6,922,688 B1 | 7/2005 | Frey, Jr. |
| 6,928,473 B1 | 8/2005 | Sundaram et al. |
| 6,941,555 B2 | 9/2005 | Jacobs et al. |
| 6,947,430 B2 | 9/2005 | Bilic et al. |
| 6,978,271 B1 | 12/2005 | Hoffman |
| 6,985,956 B2 | 1/2006 | Luke et al. |
| 7,039,934 B2 | 5/2006 | Terakado et al. |
| 7,051,087 B1 | 5/2006 | Bahl et al. |
| 7,065,579 B2 | 6/2006 | Traversat et al. |
| 7,069,295 B2 | 6/2006 | Sutherland et al. |
| 7,073,090 B2 | 7/2006 | Yanai et al. |
| 7,111,303 B2 | 9/2006 | Macchiano et al. |
| 7,120,666 B2 | 10/2006 | McCanne et al. |
| 7,145,866 B1 | 12/2006 | Ting et al. |
| 7,146,427 B2 | 12/2006 | Delaney et al. |
| 7,149,769 B2 | 12/2006 | Lubbers et al. |
| 7,152,069 B1 | 12/2006 | Santry et al. |
| 7,184,424 B2 | 2/2007 | Frank et al. |
| 7,188,194 B1 | 3/2007 | Kuik et al. |
| 7,200,641 B1 | 4/2007 | Throop |
| 7,203,730 B1 * | 4/2007 | Meyer et al. ............... 709/213 |
| 7,206,805 B1 | 4/2007 | McLaughlin, Jr. |
| 7,237,036 B2 | 6/2007 | Boucher et al. |
| 7,260,638 B2 | 8/2007 | Crosbie |
| 7,263,108 B2 | 8/2007 | Kizhepat |
| 7,278,142 B2 | 10/2007 | Bandhole et al. |
| 7,296,050 B2 | 11/2007 | Vicard |
| 7,333,451 B1 | 2/2008 | Khalil et al. |
| 7,353,266 B2 | 4/2008 | Bracewell et al. |
| 7,406,523 B1 | 7/2008 | Kruy et al. |
| 7,415,018 B2 | 8/2008 | Jones et al. |
| 7,428,584 B2 * | 9/2008 | Yamamoto et al. .......... 709/223 |
| 7,436,789 B2 | 10/2008 | Caliskan et al. |
| 7,447,209 B2 | 11/2008 | Jeffay et al. |
| 7,463,582 B2 | 12/2008 | Kelly et al. |
| 7,526,577 B2 | 4/2009 | Pinkerton et al. |
| 2001/0020273 A1 | 9/2001 | Murakawa |
| 2001/0026550 A1 | 10/2001 | Koabayashi |
| 2001/0049739 A1 | 12/2001 | Wakayama et al. |
| 2002/0026558 A1 | 2/2002 | Reuter et al. |
| 2002/0029286 A1 | 3/2002 | Gioquindo et al. |
| 2002/0039196 A1 | 4/2002 | Chiarabini et al. |
| 2002/0052962 A1 | 5/2002 | Cherkasova et al. |
| 2002/0062387 A1 | 5/2002 | Yatziv |
| 2002/0065875 A1 | 5/2002 | Bracewell et al. |
| 2002/0087811 A1 | 7/2002 | Khare et al. |
| 2002/0091830 A1 | 7/2002 | Muramatsu |
| 2002/0126658 A1 | 9/2002 | Yamashita |
| 2002/0165978 A1 | 11/2002 | Chui |
| 2003/0018784 A1 | 1/2003 | Lette et al. |
| 2003/0023811 A1 | 1/2003 | Kim et al. |
| 2003/0026246 A1 | 2/2003 | Huang et al. |
| 2003/0065733 A1 | 4/2003 | Pecone |
| 2003/0069995 A1 | 4/2003 | Fayette |
| 2003/0070144 A1 | 4/2003 | Schnelle et al. |
| 2003/0081592 A1 | 5/2003 | Krishnarajah et al. |
| 2003/0118053 A1 | 6/2003 | Edsall et al. |
| 2003/0130986 A1 | 7/2003 | Tamer et al. |
| 2003/0161312 A1 | 8/2003 | Brown et al. |
| 2003/0172157 A1 | 9/2003 | Wright et al. |
| 2003/0182349 A1 * | 9/2003 | Leong et al. ............... 709/100 |
| 2003/0202510 A1 | 10/2003 | Witkowski et al. |
| 2003/0204611 A1 | 10/2003 | McCosh et al. |
| 2004/0025477 A1 | 2/2004 | Sichera et al. |
| 2004/0047367 A1 | 3/2004 | Mammen |
| 2004/0078465 A1 | 4/2004 | Coates et al. |
| 2004/0100952 A1 | 5/2004 | Boucher et al. |
| 2004/0181476 A1 | 9/2004 | Smith et al. |
| 2004/0184455 A1 | 9/2004 | Lin |
| 2004/0215688 A1 | 10/2004 | Frank et al. |
| 2005/0033740 A1 | 2/2005 | Cao et al. |
| 2005/0058131 A1 | 3/2005 | Samuels et al. |

| | | | |
|---|---|---|---|
| 2005/0102522 A1 | 5/2005 | Kanda | |
| 2005/0138003 A1 | 6/2005 | Glover | |
| 2005/0144199 A2 | 6/2005 | Hayden | |
| 2005/0166022 A1 | 7/2005 | Watanabe | |
| 2005/0175005 A1 | 8/2005 | Brown | |
| 2005/0198371 A1 | 9/2005 | Smith et al. | |
| 2005/0246401 A1 | 11/2005 | Edwards et al. | |
| 2005/0267929 A1 | 12/2005 | Kitamura | |
| 2005/0270856 A1 | 12/2005 | Earhart et al. | |
| 2005/0286517 A1 | 12/2005 | Babbar et al. | |
| 2006/0036602 A1 | 2/2006 | Unangst et al. | |
| 2006/0077902 A1 | 4/2006 | Kannan et al. | |
| 2006/0133365 A1 | 6/2006 | Manjunatha et al. | |
| 2006/0168345 A1 | 7/2006 | Siles et al. | |
| 2006/0176903 A1 | 8/2006 | Coulier | |
| 2007/0101023 A1 | 5/2007 | Chhabra et al. | |
| 2007/0110047 A1 | 5/2007 | Kim | |
| 2008/0181158 A1 | 7/2008 | Bouazizi et al. | |
| 2008/0279106 A1 | 11/2008 | Goodfellow et al. | |

FOREIGN PATENT DOCUMENTS

| | | |
|---|---|---|
| EP | 0654736 | 5/1995 |
| EP | 0700231 | 3/1996 |
| EP | 0706113 | 4/1996 |
| JP | 2001094987 | 4/2001 |
| JP | 2001359200 | 12/2001 |
| JP | 2002252880 | 9/2002 |
| JP | 2002318725 | 10/2002 |
| JP | 2005265914 | 9/2005 |
| WO | WO/01/01270 | 4/2001 |
| WO | WO02/15018 | 2/2002 |

OTHER PUBLICATIONS

Kozierok, Charles, M, Software RAID, 2004, The PC Guide, http://www.pcguide.com/ref/hdd/perf/raid/conf/ctrlSoftware-c.html.*

International Search Report and Written Opinion of International Search Authority for PCT/US07/14572 mailed Jun. 17, 2008 (11 pages).

Lin JC and Paul S, "Rmtp: a reliable multicast transport protocol," Proceedings of IEEE INFOCOM '96, vol. 3, pp. 1414-24, 1996.

B. Quinn et al. IP Multicast Applications: Challenges and Solutions. Sep. 2001. Network Working Group, RFC 3170.

Thomas E. Anderson, Michael D. Dahlin, Jeanna M. Neefe, David A. Patterson, Drew S. Roselli, and Randolph Y. Wang, Serverless network file systems. Dec. 1995. In Proceedings of the 15th Symposium on Operating Systems Principles.

International Search Report for Application No. PCT/US02/40205 dated May 27, 2004.

Ki-II Kim et al., "Internet Multicast Provisioning Issues for Hierarchical Architecture", 2001, IEEE.

Lee et al. "A Comparison of Two Distributed Disk Systems" Digital Systems Research Center—Research Report SRC-155, Apr. 30, 1998, XP002368118.

Lee and Thekkath, "Petal: Distributed Virtual Disks", Systems Research Center.

PCT International Search Report for PCT App. No. PCTUS05/01542 dated Aug. 25, 2008.

Bruschi and Rosti, "Secure multicast in wireless networks of mobile hosts: protocols and issues", Mobile Networks and Applications,vol. 7, issue 6 (Dec. 2002), pp. 503-511.

"Computer Networking Essentials" Copyright 2001, Cisco Systems, Inc., 2001.

Satran et al. "Internet Small Computer Systems Interface (iSCSI)" IETF Standard, Internet Engineering Task Force, IETF, CH, Apr. 2004, XP015009500, ISSN: 000-0003.

"Limited distributed DASD Checksum, a RAID Hybrid" IBM Technical Disclosure Bulletin, vol. 35, No. 4a, Sep. 1992, pp. 404-405, XP000314813 Armonk, NY, USA.

EP Supplementary Search Report for EP 07 80 9803 dated Jun. 2, 2009.

* cited by examiner

GENERATING STORAGE SYSTEM COMMANDS

This application represents a continuation-in-part of co-owned U.S. patent application having Ser. No. 11/205,895 titled "Disaggregated Resources and Access Methods" filed on Aug. 16, 2005.

FIELD OF THE INVENTION

The field of the invention relates to generating commands for a storage device.

BACKGROUND OF THE INVENTION

Virtualized storage systems offer clients access to multiple physical storage devices as if they comprise a single logical volume. Some storage systems function in a distributed manner where clients access physical storage devices directly without requiring dedicated management servers. Zetera Corporation's Z-SAN™ technology represents one such implementation that allows clients to directly interact with physical storage devices.

The virtual storage system should provide clients robust access to data storage. A system can be considered robust if multiple clients are able to share access to the system when the system dynamically changes. Furthermore, the system should allow clients to function independent of each other and should also allow the physical storage devices to function independent of each other. Independent clients are most efficient when they can adapt to changes in the system without requiring information from other clients. For example, two clients sharing a logical volume in the virtual storage system could have different views of the logical volume. Sometimes one client could see a physical storage device associated with the logical volume while the other client might not see the same physical device; however, the logical volume could still be useful to both clients. If the logical volume comprises redundant data on different physical devices, then both clients could still access the logical volume for read access while write accesses might require restrictions to prevent the data becoming unsynchronized.

Clients should have an ability to discover elements of the virtual storage system where elements include logical devices, physical storage devices, partitions, proxies, services, or other components of the virtual storage system. Discovery of virtual storage system elements is described in co-owned U.S. patent application having Ser. No. 11/205,895 titled "Disaggregated Resources and Access Methods" filed on Aug. 16, 2005, herein incorporated by reference in its entirety. The referenced application describes aspects of discovering maps of logical devices including virtual storage systems. The maps can also change as the virtual storage system changes. In conjunction with discovering maps of virtual storage systems, the virtual storage system should also provide a method for generating storage commands in the dynamic environment, especially where clients or devices could appear or disappear without notice. High-level storage commands associated with a logical volume might not necessarily change as the virtual storage system or logical volume changes because changes occur below the volume level view of the virtual storage system. However, the low-level storage commands targeting physical devices are more likely to change to reflect updates of the system. These and other issues need to be addressed in the contemplated dynamic environments.

A preferred solution for generating storage commands should offer the following capabilities:
- Command generation should handle scenarios where clients loose visibility to portions of a shared storage area while other clients do not.
- Clients should be able to access a data set that is coherent even though parts of a logical volume storing the data set are missing; as in the case of lost physical devices mirroring some of the data.
- The system should scale to larger deployments having a larger number of clients or storage devices without necessitating introduction of extra equipment to manage the storage services.
- Commands should be generated in a manner that supports a heterogeneous mix of storage group types associated with a logical volume including RAID groups.
- The command generating system should be independent of the command transport and work in multiple storage environments including environments that employ standard protocols or proprietary protocols.

Others have addressed various aspects of virtualized storage including handling changes in a logical volume within a dynamic environment. For example, U.S. Pat. No. 6,732,171 titled "Distributed network system with virtualization" and U.S. Patent application number 2005/00144199 also titled "Distributed network system with virtualization" teach storage virtualization through the use of storage configuration identifiers stored on storage servers and management servers. The identifiers are timestamps exchanged between application clients and a storage system to indicate when a change in a storage configuration or allocation within the storage system has taken place. Application clients can then update their view of the storage system when an identifier changes. However, these references do not teach a how a storage system should generate commands through command handlers associated with the type of storage areas in the storage system.

In addition to the above references, the following references reflect varied approaches to creating maps for virtual storage systems associated with various storage media: U.S. pending patent applications 2005/0270856, 2005/0246401, 2003/0172157, 2003/0023811; and issued U.S. Pat. Nos. 6,775,673, 6,775,672, 6,772,161, 6,732,230, 5,758,050, and 5,129,088. Although these references address the specific issues for which they are intended, they do not address generating storage commands using a map of a logical volume built as a function of storage group types composing the logical volume. In some cases, the references describe commands or commands sets, but still do not teach how to generate the commands.

Thus, there remains a considerable need for methods and apparatus in virtualized storage that are able to generate storage commands as the storage environment changes.

SUMMARY OF THE INVENTION

The present inventive subject matter relates to systems and methods of generating commands for a storage system. The storage system has one or more logical volumes where a logical volume comprises a first storage area on a first storage device and a second storage area on a second storage device. Typically storage areas include partitions. The methods include providing a map of the logical volume from information associated with the storage area type of first or second storage areas. Especially preferred embodiments include those embodiments where the first type of storage area is different than the second type of storage area. The methods also include incorporating command handlers according the types of the storage areas into the map of the logical volume. The command handlers convert a storage command targeting the logical volume to a storage command targeting one of the storage areas. Other embodiments include the ability to respond to changes in the logical volume by updating the map when an indication is received that the logical volume has changed. As commands are generated, some embodiments translate data addresses that are referenced according to a volume address within the map to data addresses that are referenced according to a storage area address.

GLOSSARY

The following descriptions refer to terms used within this document. The terms are provided to ensure clarity when discussing the various aspects of the invention matter without implied limitations.

The term "storage group" means a group of one or more storage areas offering a type of storage functionality where a storage area includes partitions or groups of partitions that are related. Storage functionality includes RAID capabilities, spanning, providing parity, or functionality relating to accessing data.

The term "storage command" means a command relating to data accesses and targeting a storage area. In general a storage command comprises several parameters describing the storage command including a data address, a data request size, or a buffer for storing data associated with the command. Other possible parameters include a storage area identifier, an indication of the command to be executed, or other information useful when processing storage commands. In preferred embodiments, the data address is a Logical Block Address (LBA). The buffer is used for storing data when conducting writes or for receiving data when conducting reads and the buffer has at least enough space to store the data request size. The buffer is usually referenced via a pointer to a memory area. Storage area identifiers are used to address a specific storage area and can include IP addresses or Logical Unit Numbers (LUN).

The teachings herein may be advantageously employed by developers of storage products or storage related technology. The disclosed methods of generating storage commands may be employed to create storage products that function in a virtual environment where elements of the storage system could change dynamically.

Various objects, features, aspects, and advantages of the present invention will become more apparent from the following detailed description of the preferred embodiments of the invention, along with the accompanying drawings in which like numerals represent like components.

DETAILED DESCRIPTION

The following detailed description presents multiple examples of the inventive subject matter. Although specific examples are given to provide clarity for the material, the examples do not limit the presented concepts being conveyed. The reader should interpret the concepts to their broadest possible extent.

Virtual Storage System

Figure 1:
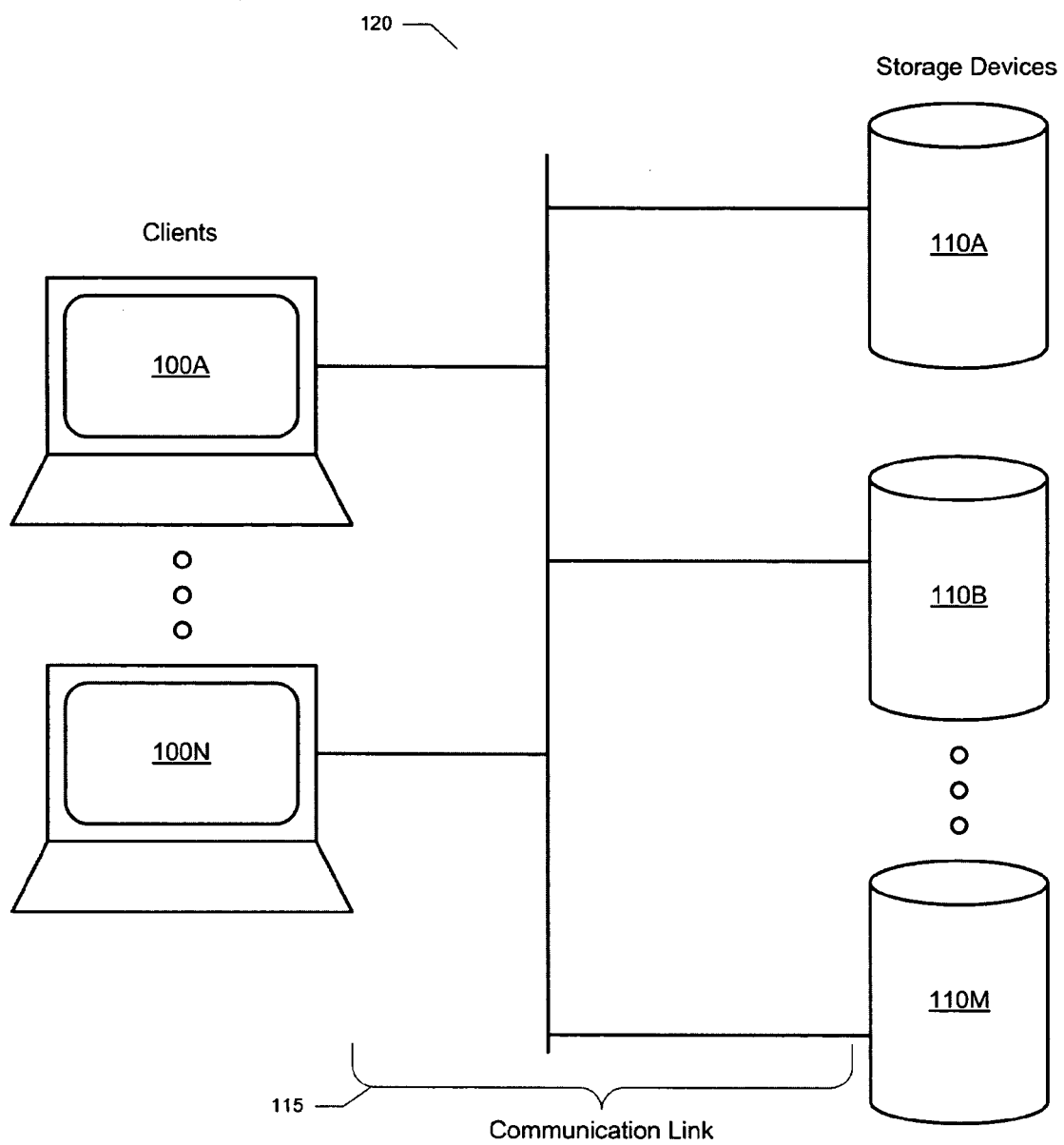
FIG. 1 illustrates an example embodiment of a virtual storage system.

FIG. 1 illustrates an example embodiment of a virtual storage system. In some embodiments, virtual storage system 120 comprises one or more of clients 100A through 100N accessing one or more storage devices 110A through 110M over communication link 115. A preferred virtual storage system 120 allows each client 100A through 100N to directly access each storage device 110A through 110M associated with a logical volume.

Clients 100A through 100N represent hosts that access or utilize data storage on storage devices 110A through 110M. Client 100A can include a general purpose computer system or a dedicated computing device. A general purpose computer system runs an operating system possibly Windows® or Linux and preferably includes a file system. General purpose computer systems are capable of running many different types of applications that could require access to storage space. Dedicated computing devices include embedded systems that have a limited set of applications, for example media players, media recorders, game consoles, or other like systems. A preferred embodiment utilizes a general purpose computer system having a file system capable of mounting a logical volume spread over one or more of storage devices 110A through 110M.

Storage devices 110A, 110B through 110M represent physical components that provide access to one or more storage media. The storage medium can be magnetic or non-magnetic. Examples of magnetic storage include disk drives or tape, where examples of non-magnetic media include optical systems, flash, RAM, or other types of memory. Storage devices 110A through 110M are not required to be a homogeneous mix of storage devices but could comprise a number of different types of storage devices. In a preferred embodiment, storage devices 110A through 110M are dedicated storage devices providing data storage on disk drives. Dedicated storage devices include rack mount systems, desktop enclosures, or other types of enclosures. Preferred enclosures offer support for multiple disk drives, for example, supporting two, four, eight, 16, or more disk drives. In some embodiments, storage device 110A represents a disk drive itself where the disk is incorporated within client 100A. Furthermore, client 100A could represent a storage device if it provides access to its storage media to client 100N, for example.

Communication link 115 communicatively couples clients 100A through 100N to storage devices 110A through 110M. In a preferred embodiment communication link 115 utilizes an Internetworking Protocol (IP) network where datagrams are exchanged over Ethernet. However, other embodiments are also possible for communication link 115. Communication link 115 could be an internal link within client 100A or an external link relative to client 100A. An internal link represents interfaces to storage devices including ATA, SATA, SAS, SCSI, PCI, or other buses. External links could comprise wired or wireless links. Examples of wired links include Ethernet, USB, Fibre Channel, Firewire, serial links, or other wired communication systems. Examples of wireless links include Bluetooth, wireless USB, 802.11, IrDA, or other non-physical links.

A preferred embodiment of a virtual storage system 120 utilizes Zetera™ Corporation's Z-SAN™ technology. The Z-SAN technology provides for an IP based Storage Area Network (SAN) environment where each of client 100A through 100N communicate with each storage device 110A through 110M via a UDP based storage protocol to transfer storage commands. The Z-SAN technology assigns IP addresses to each partition within a storage device. Consequently, a client can communicate directly with each partition without requiring additional partition identification information. Clients aggregate information about each partition, and then use the information to form a map of a logical volume comprising the partitions. Although the preferred embodiment employs a block level storage protocol to transport storage commands, the inventive subject matter operates independently of the transport protocol; therefore, it can operate equally well with other storage protocols based on standards including iSCSI, iFCP, FCIP, or even low-level protocols or interfaces including ATA, SATA, SAS, SCSI, or other storage device protocols. Furthermore, it is contemplated the disclosed techniques also operate with file system-level storage protocols including NFS, CIFS, or other file oriented protocols.

In virtual storage system 120, clients 100A through 100N often mount a logical volume in a manner that the logical volume appears as a locally connected storage area. For example, client 100A might support the CIFS protocol and mount a disk on storage device 110B. A logical volume represents a virtual representation of one or more storage areas located on one or more of storage devices 110A through 110M. Within the context of this document, the term "partition" means a storage area within a storage device. For example, a partition could be a single portion of a hard disk drive where the extent represents a fraction of the disk drive's capacity. Alternatively, a partition could represent a storage area that spans across two or more disks within a chassis housing multiple disk drives. It is also contemplated that a partition could represent a storage area presented by a proxy where the storage area comprises multiple remote partitions. The chassis or the proxy exposes the aggregate storage area as a single storage area.

Logical Volumes

Figure 2:
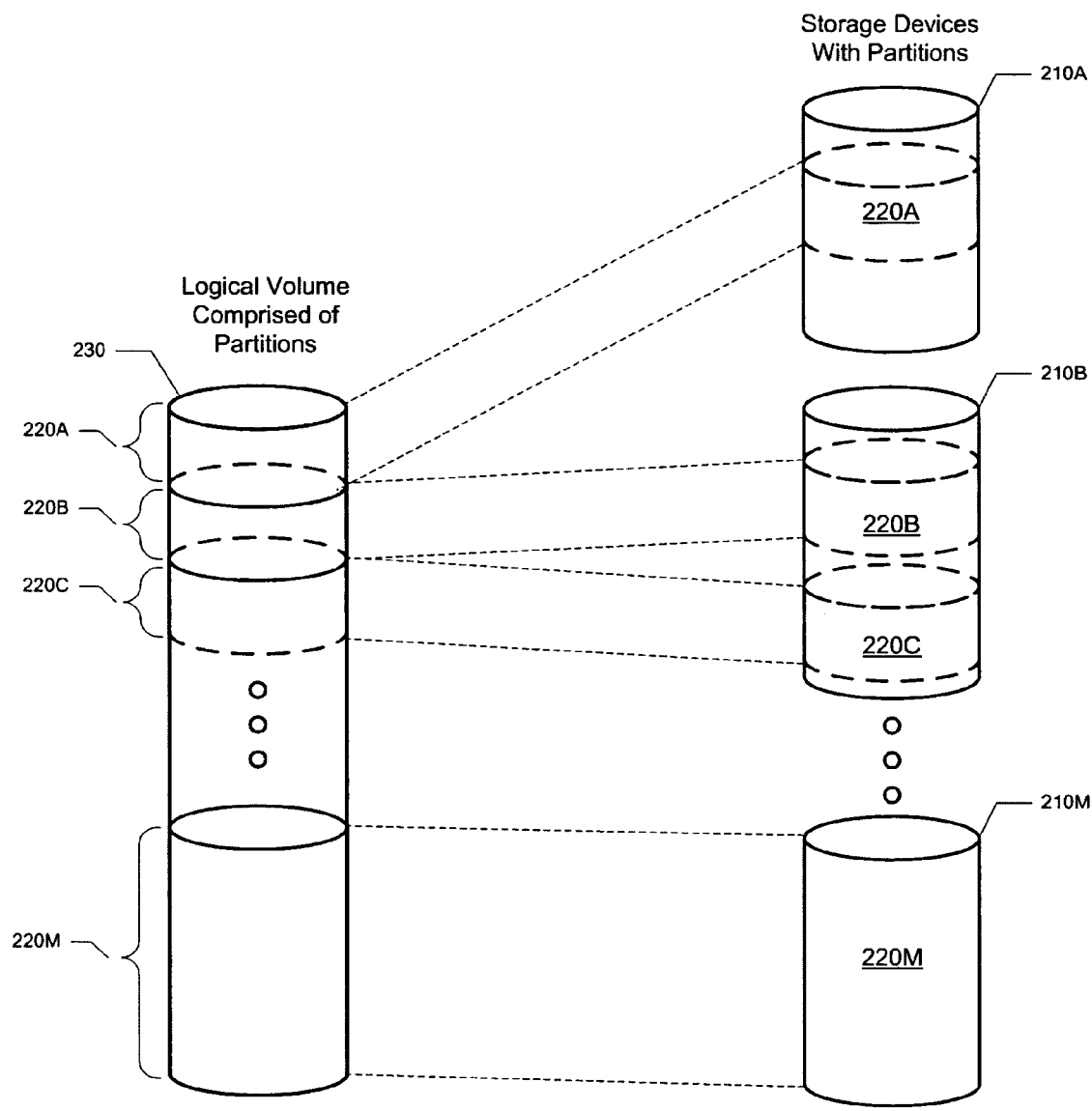
FIG. 2 illustrates an example embodiment of a logical volume comprising a plurality of partitions.

FIG. 2 illustrates an example embodiment of a logical volume comprising a plurality of partitions. Logical volume 230 comprises partitions 220A through 220M where the partitions are spread among storage devices 210A through 210M. Preferably, logical volume 230 represents an extent of LBAs running from zero to a maximum value spread over partitions 220A through 220M. In some embodiments, the LBAs are represented by a 48-bit value; however, other LBA sizes are also contemplated. Partition 220A illustrates an example where storage device 210A has a single storage area participating in logical volume 230. Partitions 220B and 220C provide an example showing how storage device 210B can have more than one storage area belonging to logical volume 230. In addition, partition 220M shows that all of storage device 210M can provide a storage area to logical volume 230.

Although logical volume 230 as shown illustrates a linear span across partitions 220A through 220M, other more complex structures can be formed from the partitions composing the volume. In a preferred embodiment, logical volume 230 comprises a plurality of different types of storage structures include those that provide mirroring, striping, spanning, parity, or that provide RAID capabilities. Each type of storage structure comprises a group of partitions. Therefore, logical volume 230 can be considered a group of storage groups where the storage groups are organized in a manner providing the system a set of common rules for managing logical volume 230.

Storage Groups

Figure 3:
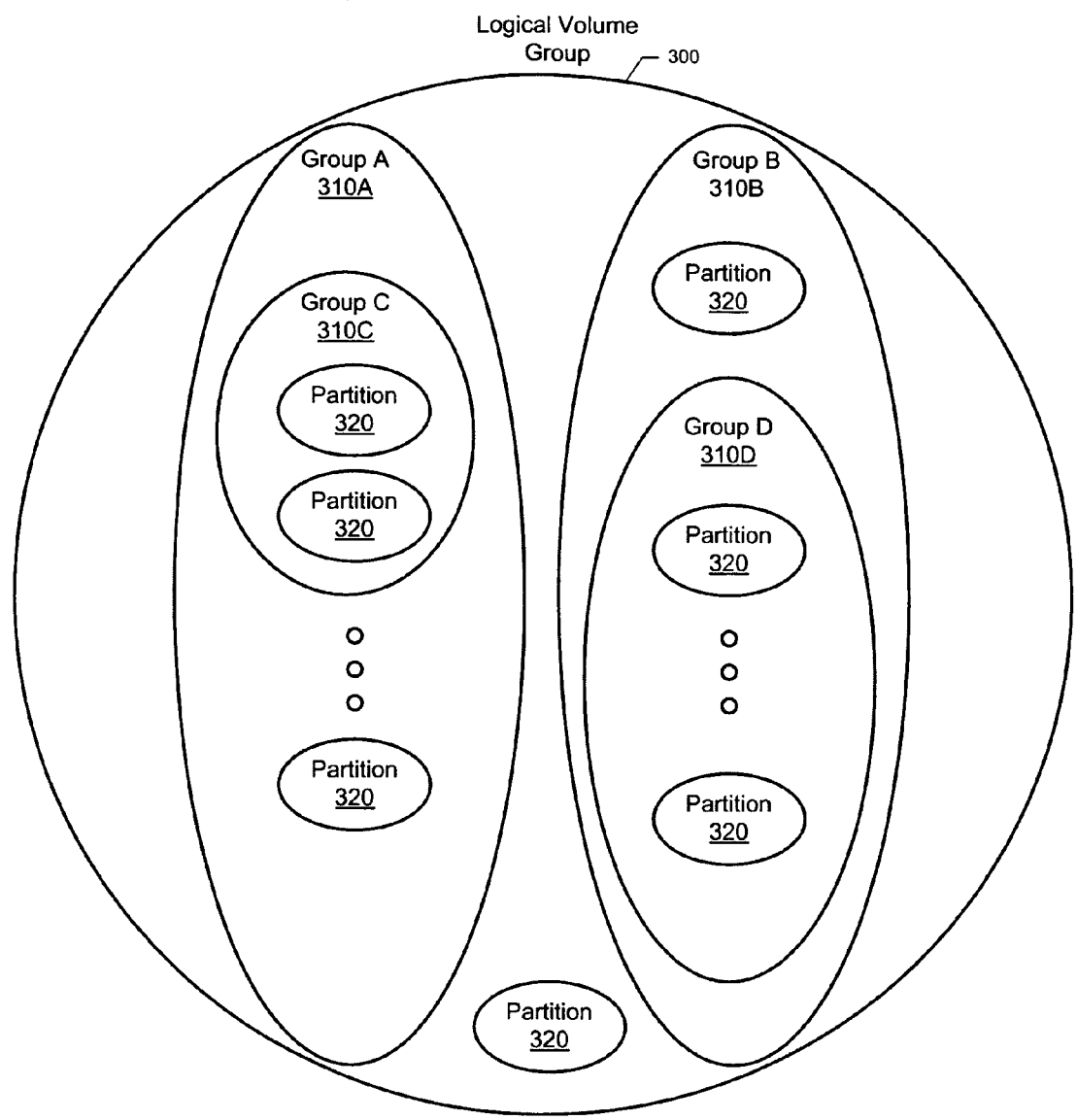
FIG. 3 presents an illustration of how a logical volume can comprise storage groups.

FIG. 3 presents an illustration of how a logical volume can comprise storage groups. Logical volume 300 comprises one or more storage groups where a storage group ultimately comprises one or more partitions. In a preferred embodiment, a storage group comprises one or more members where each member is also a storage group. For example, group 310A comprises two members. The first member of group 310A is group 310C and the second member of group 310A is a partition 320. Partition 320 represents a storage group having a single member that substantially embodies the characteristics of a partition on a storage device. As shown, logical volume group 300 has three members including group 310A, 310B, and a partition 320. Group 310B includes group 310D and a partition 320.

Preferably, partition 320 represents an elemental group in the sense that the partition is the smallest representation of a storage group. All storage groups must ultimately have at least one partition to provide clients access to storage media located on a storage device. In one embodiment, partition 320 can be represented by a data structure stored in a client memory where the data structure includes information relating to the partition on the storage device. For example, the data structure preferably includes the partition identifier used to address the partition, the data transfer size that a partition expects, attributes associated with the partition, or other information useful when accessing the partition. In a preferred embodiment, the partition identifier includes an external address relative to a client including an IP address (IPv4 or IPv6) or a LUN; however, a partition identifier is also contemplated to include an internal address where the partition is accessed within the client. A SCSI ID could represent an internal address.

Storage Groups: Group Types

Preferably storage groups are classified according to the storage functionality they provide within the logical volume. Organizing the storage groups by type aids in establishing a common rule system understood by elements of the virtual storage system so that all clients are able to coherently access data. The rules aid clients when generating storage commands for the logical volume because each group type can process a storage command independently from another group type. Preferred storage group types include RAID group types or non-RAID group types. A RAID group type includes storage groups where redundancy in some form is employed to protect data stored on a storage device associated with the storage group. Example RAID group types include mirror groups, parity groups, Z-RAID groups, or other redundant configurations. Example non-RAID group types include span groups, stripe groups, or partition groups.

One skilled in the art of storage devices will recognize the use of the term RAID which stands for Redundant Array of Independent Disks. Although striping is often classified as RAID level 0, it does not carry redundant information and is therefore classified as a non-RAID type within this document. One should also note that RAID is often associated with storage structures at the disk level. For the purposes of this document, RAID capabilities are applied at the partition level. A mirror group represents a storage group comprising members where each member of the mirror group has a duplicate of the data on the other group members. In other words, each mirror group member has a duplicate of a logical volume's extent of LBAs. A stripe group represents a storage group comprising members that are individual striped elements. A parity group represents a storage group comprising members that have parity information. The parity group can be implemented as a variant of a stripe group. A Z-RAID group represents a storage group comprising members that form staggered mirrored elements as described in co-owned U.S. patent application titled "Topology Independent Storage Arrays and Methods" having Ser. No. 11/173,765 herein incorporated by reference in its entirety. A partition group is simply the elemental group as previously described where the group comprises information about a partition. All storage group types are contemplated including archive groups, backup groups, deferred mirror groups, QoS groups, or other storage group types that can provide additional storage functionality.

Storage Groups: Group Type Organization

Figure 4:
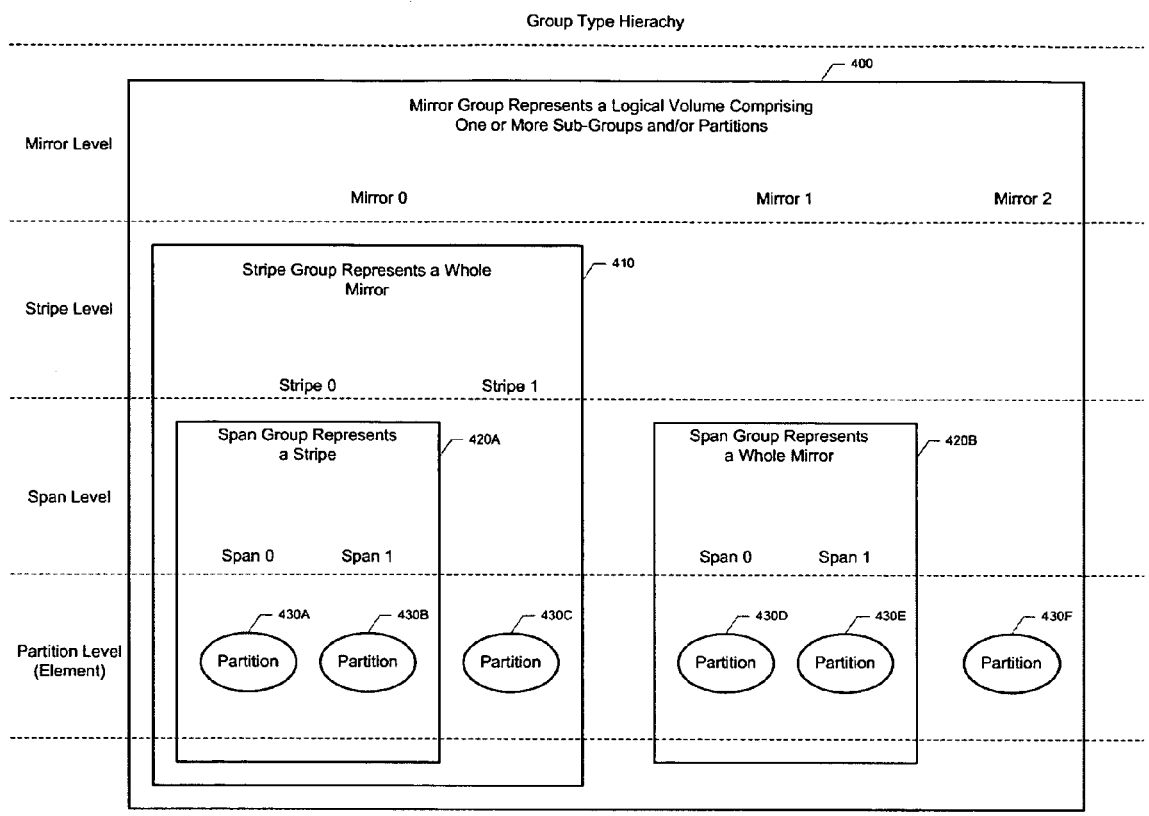
FIG. 4 presents an example embodiment of an organization of group types.

FIG. 4 presents an example embodiment of an organization of group types. Although groups can be classified into different types as a function of the functionality they provide, it is also preferable to organize storage group types in manner that facilitates generating storage commands by establishing a set of common rules under which all clients operate and under which all partitions are instantiated on storage devices. Especially preferred organizations include a hierarchy of storage group types. The example presented in FIG. 4 is provided for clarity and focuses on mirrors, stripes, spans, and partitions; however, the concepts can be extended to handle additional storage group types. In the example, mirror group 400 is placed logically at the top level of the hierarchy. Each logical volume in the storage system can comprises a mirror group having one or more members. Each member of mirror group 400 can be a group of another other lower type other than the mirror type. Furthermore each member of mirror group 400 represents a duplicate of the logical volume in the sense that each member can represent an instance of the logical volume. Stripe group 410 mirrors the data on span group 420B which also mirrors the data on partition group 430F. This illustrates that a mirror group such as mirror group 400 can comprise other groups of a lower type whether they are a stripe group type, span group type, or a partition type for this specific embodiment of a group organization.

When a storage command is issued to a logical volume comprising a mirror group, the storage command is duplicated for each member of the mirror group. For example, when a volume level storage command is issued to the logical volume represented by mirror group 400, the volume level storage command is duplicated for each member of the group: once for stripe group 410, once for span group 420B, and one for partition 430F. In this sense a mirror group transforms a single storage command into a plurality of duplicate storage commands.

The next highest level in the example storage group type hierarchy is the stripe type as shown with stripe group 410. A stripe group comprises two or more members that are either span groups or partitions as indicated by span group 420A and partition 430C. Each member of stripe group 410 represents a striped element of a complete stripe. Therefore, as data is stored on partitions associated with strip group 410 it is striped across span group 420A representing stripe element 0, then to partition 430C as stripe element 1.

A stripe group comprises a set of parameters that describe the characteristics of the stripe group. The parameters include the stripe block size which represents the number of data blocks written to each member before progressing to the next member. When a storage command is issued to a stripe group, the command is transformed into one or more stripe level commands targeting each member of the group. The stripe commands ensure that data accesses align with the stripe structure of the group by calculating the data access sizes via modulo arithmetic with respect to the stripe block size as is done in traditional striped RAID systems; however, data accesses are preformed at the group or partition level rather than at the disk level. Each member of the striped group provides the same capacity to ensure even striping.

The third level in the example hierarchy is the span type as shown with span group 420A and 420B. A span group combines two or more members together into a single linear logical storage area as represented by a range of LBAs from zero to a maximum value for the span group. For example, span group 420A comprises a first portion as indicated by partition 430A and a second portion as indicated by partition 430B each representing span element 0 and span element 1 of span group 420A, respectively. Similarly, span group 420B comprises partition 430D and partition 430E forming a single logical storage area.

A span group comprises information relating to where data within a storage command should be separated to bridge across partitions. When a span group receives a storage command, the storage command data and data size is check to see if data access would require the command to be issued to more than one member of the span group. If so, the command is transformed into one or more span commands in manner that ensures data accesses align with the member boundaries.

The partition group type is at the lowest level of the example hierarchy. Partitions 430A through 430F are each a group having one member where the one member element represents an individual partition on a storage device. One should note that each of the partitions are not required to be of a uniform size, but rather can be of any size relative to each other.

Although the preferred embodiment establishes a hierarchy with mirrors, stripes, spans, and partition; one should note that other hierarchies are also possible. For example, mirror types could be placed below partitions in a manner that each partition is mirrored individually as opposed to mirroring at the volume level. Alternatively, stripes and spans could switch levels in the hierarchy.

Storage Groups: Common Rules

Forming an organizational structure for storage groups within a logical volume provides a foundation for a set of rules for processing storage commands. Referring again to the example hierarchy in FIG. 4, volume level commands are initially processed at the mirror level if there are any storage groups at the mirror level. Mirror level processing includes generating storage commands and passing the storage commands to a lower level. If there are members of a stripe group, then the storage commands are processed at the stripe level to ensure data is accessed according to the striping rules associated with the stripe group. For example, data is accessed using modulo arithmetic based on the stripe block size and the number of members of the stripe group. Stripe level processing also includes generating storage commands and passing the storage commands to a lower level. If there are span groups, storage commands are processed at the span level, where data accesses are aligned to span member boundaries. Finally, at the partition level commands are processed to ensure the data accesses align with partition characteristics. For example, commands are formed that have the appropriate transfer size for the partition. Storage command processing will be more fully described later in this document.

Storage Groups: Group Data Structure

In some embodiments, a storage group is represented by a group data structure that provides links between groups. Preferably storage groups are linked together to form parent-child associations or peer associations. A parent group represents a group having one or more members where each member is considered a child of the parent. Each child of the same parent is a peer of the other children. In a preferred embodiment, a parent group is at a higher level in the group hierarchy than the child; however, peers can be at same or at lower levels with respect to each other. For example, a mirror group can comprise three children. Each child is an instance of a logical volume. The children could comprise any combination of striped groups, span groups, or partition groups while each of the children is considered a peer within the mirror group.

In a preferred embodiment, a group data structure comprises a generic data structure representing links to other groups and function pointers. The generic structure is then incorporated into an additional data structure comprising information for a specific type of group: a mirror, stripe, span, or other storage group types. This approach lends itself to implementation in C for embedded systems; however, one skilled in the art of computer programming will recognize that there are numerous alternative approaches for forming group data structures all of which are contemplated including object oriented approaches.

Figure 5:
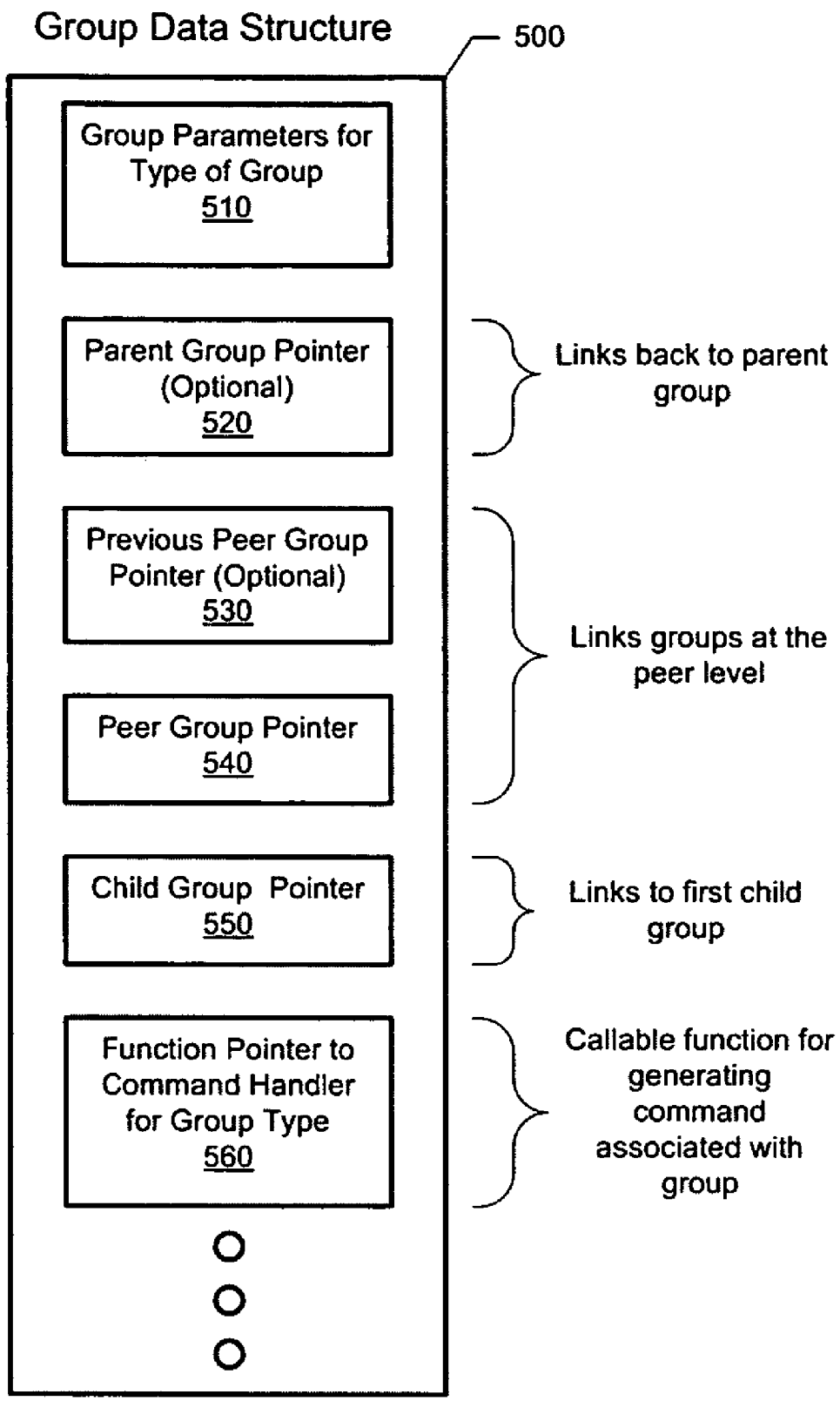
FIG. 5 illustrates an example embodiment of a storage group data structure.

FIG. 5 illustrates an example embodiment of a storage group data structure. A storage group can be represented by group data structure 500 comprising group parameters 510 that describe the characteristics for the type of storage group associated with the storage group. Group parameters 510 are different depending on the type of group or the characteristics of the specific group for which the data structure represents. In addition, data structure 500 also comprises several pointers. Group pointers form link lists of groups to facilitate processing storage commands. Preferred group pointers include optional parent group pointer 520 or optional previous peer group pointer 530. Parent group pointer 520 links the current group with the parent group of which the storage group is a member. If the storage group is the highest level group within a logical volume, then parent pointer 520 has a value of NULL. The parent group, in a preferred embodiment, represents a storage group at a higher level in the group hierarchy. For example, if the storage group is a partition and is a member of a stripe group, then parent pointer 520 would link back to the stripe group. Previous peer pointer 530 links back to a group that is a peer with the storage group. For example, if the current group is a partition and is the third member of a striped group, then the previous peer pointer 530 would link back to the second member of the striped group. Both parent pointer 520 and previous peer pointer 530 are optional in the preferred embodiment.

Especially preferred pointers include peer group pointer 540, child group pointer 550, or function pointer 560. Peer pointer 540 links the storage group with the next member within the same parent group. Child pointer 550 points to the first member of the storage group. By providing peer pointer 540 and child pointer 550, the linked list of groups can be traversed when processing commands.

Each of the group pointers in data structure 500 can also have a value of NULL as opposed to pointing to another group. A value of NULL indicates that the end of the chain of links has been encountered. For example, while processing a storage command associated with a storage group, each child of the storage group will be examined by traversing peer pointer 540 links until a NULL is encounter. The NULL indicates that all the children of the storage group have been processed.

One skilled in the art of computer programming will recognize there are numerous possible embodiments that establish relationships between storage groups. For example, an array of peer level storage groups could replace the peer link list. All embodiments forming storage group relationships are contemplated.

Function pointer 560 represents a pointer to a storage group type specific command handler that processes a storage command for the type of the storage group. In a preferred embodiment, each type of storage group has at least one associated command handler. The command handler function, preferably, uses group parameters 510 to process a storage command and thereby generates storage commands for the group. Furthermore, as the command handler executes, it transforms the storage command according to the rules for the specific type of storage group and generates one or more storage commands that are to be operated on by the command handler for each of the child members.

Each group represents a logical storage area, from a partition up to multiple mirrors forming a single logical volume. A preferred embodiment accesses data within each logical storage area via a data addressing scheme associated with the storage area. The preferred scheme is to use block-level addressing where each block of data is addressed uniquely within the storage area. A preferred embodiment uses LBAs to address each data block having a size of 512 bytes. One could consider the storage group type command handlers as a transform on a command's data and the LBAs associated with the command's data. Also, in a preferred embodiment, each storage area represented by a storage group has an extent of LBAs ranging from zero to a maximum value. The extent of LBAs for each storage group is also stored in parameters 510. By defining each storage group as an individual extent of LBAs, each command handler can process storage commands in a manner that is independent from their parent group. This level of independence provides for the ability to link storage groups or command handlers together as desired to form a logical volume.

The functionality provided by the command handler reflects the functionality of the associated type of storage group; however, this does not limit the behavior of a command handler to just the functionality of the storage group type. A command handler can execute additional instructions to aid in processing a storage command or to offer other capabilities. For example, a parity group command handler for a RAID-5 system would include instructions to execute read-modify-write operations on its group members and function similar to a stripe group command handler. Such instructions include calculating XOR parity for members of the parity group. Furthermore, additional instructions could include out of band management, monitoring the virtual storage system, error checking, call or execute remote functions, or any other capabilities.

Storage Groups: Command Stack

Having linked storage groups coupled with command handlers associated with the storage group type provides for establishing a command stack for generating storage commands. A command stack represents a data structure construct where the data structure includes pointers to functions. Calling functions through function pointers allows for reassignment of a function during run-time by changing a pointer which provides for a dynamic call chain that can be constructed on the fly. Using a command handler approach provides a host the ability to create a command stack that is specific for a logical volume without incurring additional overhead for processing other logical volumes. In other words, each logical volume in the system has a command stack reflecting the volume's topology; however, no matter the topology each command stack accesses the same set of command handlers. For example, if there are four command handlers for each type of storage group (mirrors, stripes, spans, or partition), then the system only needs the four command handlers because the storage groups carry the context of their group within their data structure parameters. In a preferred embodiment, when a client discovers a logical volume, the client pieces together the linked list of storage groups following the rules of the hierarchy. Once the storage groups are linked together, the linked structure having parameters and a command handler for each storage group represents a map of the logical volume. Furthermore, the linked structure represents the command stack for the logical volume. A client can then discover additional logical volumes while reusing the same command handlers because the additional logical volumes carry their map information through their own linked structure of storage groups.

One should also note that when a change in the logical volume is discovered, the linked structure can be updated quickly. For example, if additional spans are added, then the additional storage groups are linked in to the structure at the appropriate spot thereby updating the logical volume with little disruption to accessing the logical volume.

Alternative Links

Other links are also contemplated within the storage group structure. In one embodiment, an alternative link is provided to cross link mirror group members especially when mirror group members include stripe groups. Such alternative links allow for establishing RAID 10 like storage structures. In some embodiments a RAID 10 command handler is also provided to traverse the alternative links when a striped group member is not necessarily accessible to find an alternative storage group capable of providing access to requested data. Alternative links can also operate at the partition level to provide partition-level mirroring.

Logical Volume Map: Command Stack

In a preferred embodiment, the logical volume command stack accepts a high-level storage command as an input. The command stack processes a storage command passing the storage command to the top level command handler. Each command handler transforms the storage command into one or more storage commands appropriate for each level in the hierarchy. Then, each of these storage commands are passed to the next level's command handlers until the bottom is reached at the partition level. The partition level command handlers generate partition level storage commands and places them into a queue for later packaging or transmission to partitions.

Figure 6:
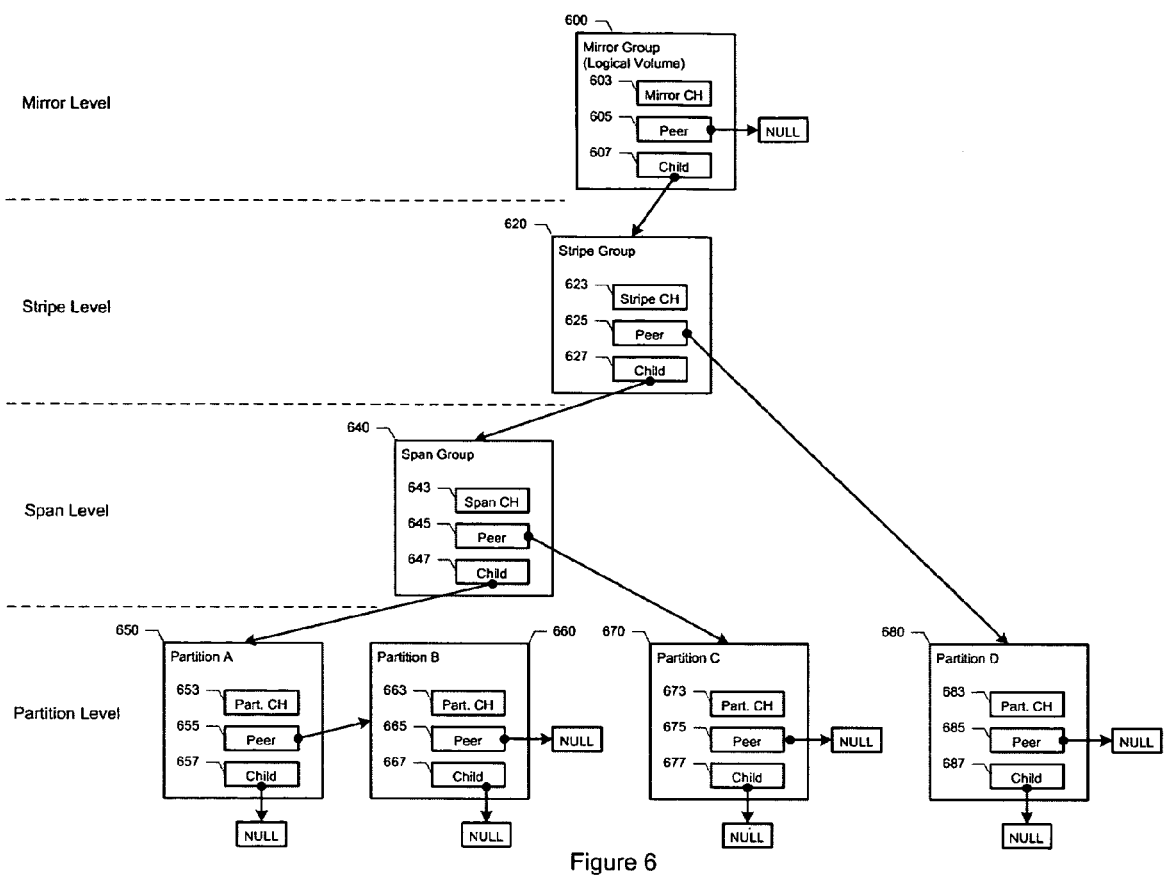
FIG. 6 illustrates an example embodiment of a logical volume map represented by a command stack of linked storage groups.

FIG. 6 illustrates an example embodiment of a logical volume map represented by a command stack of linked storage groups. This specific example is constructed for clarity to show how the concepts of linked storage groups and command handlers combine to form a map of the logical volume as represented by a command stack. The example is not comprehensive; however, the concepts can be generalized to larger, complex, heterogeneous logical volumes. The logical volume maps to storage groups where the storage groups map to partitions. At each step of the storage command generation process, one can consider that storage commands are transformed by translating high-level data addresses into low-level data addresses while breaking data into chunks. For example, a logical volume LBA is translated to a storage group LBA which is then ultimately transformed to a partition LBA. In a preferred embodiment, storage devices then transform the partition LBA into a data address within the storage device's storage media.

Logical Volume Map: Mirror Level

In the example, a logical volume is represented by mirror group 600. In this example, there are two mirrors associated with the logical volume. The first mirror is represented by stripe group 620 and the second mirror is represented by partition group 680. A group data structure is used to store the various storage group parameters, their group links, and their pointers to their command handlers. Mirror group 600 includes function pointer 603 that points to a mirror command handler, peer pointer 605, and child pointer 607. Peer pointer 605 has a value of NULL which indicates that there are no peers associated with this mirror group. Child pointer 607 points to stripe group 620 which starts the chain of links representing members of mirror group 600.

When the system accesses data from the logical volume, it issues a volume level command and calls mirror command handler through function pointer 603. If the command is a read command, then the volume command could have a pointer to a receive buffer rather than a buffer filled with data. In a preferred embodiment, the mirror command handler uses the parameters of mirror group 600 to process the command. The mirror command handler duplicates the volume level command by passing a pointer to the volume command to the command handler for each of the children of the mirror group. For example, it first calls the stripe command handler through function pointer 623 of stripe group 620 passing the volume level command to the stripe command handler. Once the stripe command handler returns, the mirror command handler then calls the partition command handler through function pointer 683 of partition group 680 again passing the volume level command to the partition command handler. The partition handler processes the volume level command and transforms it into one or more partition level commands where each partition level command conforms to the proper form for communication with partition D. Partition group 680 is last in the peer chain as indicated by peer pointer 685 having a NULL value and has no children has indicated by the NULL value for child pointer 687. The partition command handler transforms the volume level command into a linked list of partition level commands that can be packaged or transmitted to the target partitions.

Preferred volume level commands are issued from a file system. File system are contemplated to include multi-initiator file systems or non-multi-initiator file systems. Multi-initiator files systems provide multiple clients shared access to the same data on a storage device without having the data become corrupted. An example of a preferred multi-file system includes the DataPlow™. San File System (SFS). A non-multi-initiator file system provides access for a single client, NTFS for example.

Logical Volume Map: Stripe Level

In the example, stripe group 620 is a child of mirror group 600 and is therefore one instance of the logical volume. Peer pointer 625 points to the next mirror which, in this example, is partition group 680. In this embodiment, stripe group 620 comprises two striped elements: span group 640 (pointed to by child pointer 627) and partition group 670 (pointed to by peer pointer 645). Stripe group 620 is also stored in memory through a group data structure.

The stripe command handler receives the volume level command when the stripe command handler is called through function pointer 623. The stripe command handler transforms the volume level command into one or more commands for each of its children by mapping the LBAs of the volume level command to the LBA extents of the children using the stripe block size of the stripe. In this example, the stripe command handler uses the stripe group's parameter information to transform the volume level command's LBAs into offsets into each of its child groups. Recall each group, in a preferred embodiment, has an extent of LBAs running from zero to a maximum value to keep each group independent from its parent group. For a stripe group, the stripe command handler calculates the offsets into each child by using modulo arithmetic based on the stripe groups block size and the number of members in the stripe group. Once the offsets are calculated and the data is broken into chucks if necessary for each child, the stripe command handler begins walking through the command handlers for each of its children. The stripe command handler will pass a first stripe level storage command to a first child, then a second stripe level storage command to a second child, and so on. Furthermore the stripe command handler will loop back to the first child if necessary. For this example, the stripe command handler calls the span command handler through function pointer 643, then calls the partition command handler through function pointer 673 associated with group 670 possibly going back to group 640 if necessary. Function pointer 673 points to the same partition command handler as function pointer 683. The partition command handler uses partition group 670 parameter information which includes the partition's preferred data transfer size to transform the stripe level command into one or more partition level commands having the appropriate transfer size for the target partition. The partition level commands are linked into a queue of partition level commands that a ready for transmission. The partition level commands are substantially ready for submission to the target partition on a storage device. Further processing could be required for packets or datagrams sent over a communication link, possibly for congestion avoidance.

Note that partition group 670 is the last member of span group 640. Peer pointer 675 has a value of NULL indicating to the stripe command handler there are no more children for processing. Additionally, because partition group 670 represents partition C, an elemental member, partition group 670 does not have any children; consequently, child pointer 677 has a value of NULL. Therefore, the partition command handler does not make any further command handler calls, and returns back to the stripe command hander after each call by the stripe command handler.

Logical Volume Map: Span Level

Span group 640 is a child of stripe group 620 and is a single striped element of the striped group. Span group 640 comprises two partitions as represented by partition group 650 and partition group 660. Just as in the case of mirror group 600 and stripe group 620, span group 640 is stored in memory as a group data structure having the parameters for the span group. In this example, the parameters include the extent of each partition group and where data access should bridge between the partitions.

In the current example, when the span command handler is called from the stripe command handler, the span command handler receives the stripe level command. The span command handler transforms the stripe level command into one or more span level commands targeting each child of span group 640. The transformation is preformed through a mapping of the high-level LBAs to the LBA extents of the children. Child pointer 647 points to partition group 650, which is the first child and is linked to partition group 660 through peer pointer 655. Partition group 660 is the last of the span group members as indicated by the NULL value of peer pointer 665. The span command hander compares the LBA of the high-level command plus the size of the data request to the LBA extents of the children to determine where, if necessary, the data should be broken. Then, the span command handler begins calling children's partition handlers through function pointers 653 and 663 which also point to the same partition command handler as function pointers 673 and 683. The partition command handlers transform the span level commands into the partition level commands for partitions A and B as previously described. Partition groups 650 and 660 are the last in the command stack because their child pointers 657 and 667, respectively, have NULL values. The partition handlers link the partition level commands to the queue for partition level commands to be sent to the storage device, and once they complete processing they return back to the span handler.

The example presented in FIG. 6 illustrates an embodiment where the command stack processes storage commands by descending to the partition level first. This descent approach provides for forming the queue of partition level commands and provides for minimal processing overhead.

For the example presented in FIG. 6, partitions A, B, C, and D are not required to have identical structure because they play different functional storage roles within the logical volumes. However, for this specific example, they should have capacities that relate to each other. For example, partition D should have the same storage capacity as the combined capacities of partitions A, B, and C because partition D is one complete instance of the logical volume and A, B, and C form another complete instance of the logical volume. In addition, partition C should have the same capacity as the combined capacities of partitions A and B, because partition C represents one striped element and the combined partitions A and B represent the other striped element of a striped group. Partitions A and B can be of different capacities as long as their combined capacity is equivalent to partition C. This example illustrates how a logical volume can comprise a heterogeneous mix of partitions or storage group types.

Although the preferred embodiments employs linked lists to form relationships between storage groups, one skilled in the art of computer programming will recognize other embodiments are possible. For example, the peer relationships between members could be replaced by placing members at the same level in the hierarchy within an array. Consequently, a command handler can iterate through the index of the array rather than walking the peer link chain. All embodiments of the command stack are contemplated.

Command Handlers

The command handlers operate on storage commands by forming storage commands and passing the storage commands to lower level command handlers. The storage commands are preferably stored in data structures having several members including a volume level LBA, a group LBA that represents an offset into a storage group, a data request size, or a pointer to a buffer for storing data in a memory. In a preferred embodiment, the volume level LBA is used by stripe or span command handlers to properly calculate how to operate on a storage command to generate storage command targeting the stripe or span group children. The group LBA is a value representing an offset from zero into the group. Furthermore, the storage group can comprise a link to the partition level command queue associated with the storage command.

Command handlers associated with the storage group types transform storage commands according to rules representing the functionality of the storage group. Preferred command handlers are generic in the sense they do not carry context of the command they operate on, but rather obtain the context information from the storage group and the commands passed to them. The following descriptions provide additional detail on how preferred command handlers operate on storage commands. Command handlers handle various types of storage commands including reading, or writing by partitioning data buffers associated with the storage command. In a preferred embodiment, command handlers have the responsibility to break data accesses down from a high level to a low level so the low-level storage commands can be transmitted to a storage group or, ultimately, to a partition.

Command Handlers: Mirror Command Handlers

Figure 7A:
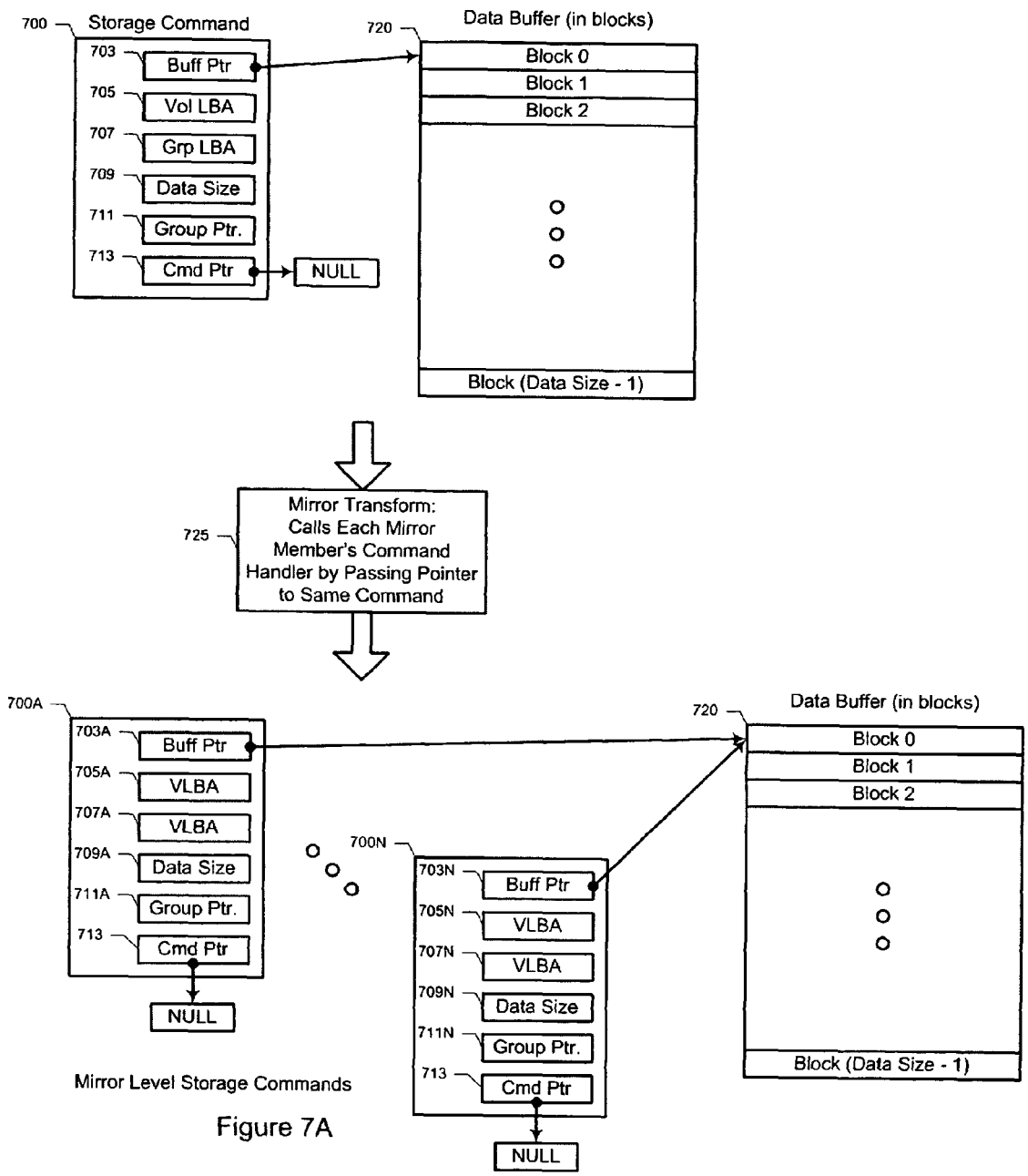
FIG. 7A shows an example embodiment of the transformation of a volume level command by a mirror command handler.

FIG. 7A shows an example embodiment of the transformation of a volume level command by a mirror command handler. Mirror command handler 725 operates on a storage command 700. Storage command 700 represents a volume level storage command for mirror handler 725 in the preferred embodiment because mirrors are placed logically at the top of the storage group type hierarchy. In other words, mirror handler 725 will only receive volume level storage commands in the preferred embodiment. Each command handler is able to process a storage command as represented by storage command 700; however, the value of the elements in the command structure can be different depending on how previous command handlers, if any, operated on the storage commands.

Storage command 700 comprises buffer pointer 703, volume LBA 705, group LBA 707, request data size 709, group pointer 711, and command pointer 713. Buffer pointer 703 points the head of buffer 720 used to store data associated with storage command 700. If storage command 700 represents a data write, then buffer 720 stores the data to be written; however, if storage command 700 represents a data read, then buffer 720 is a storage area for storing data read from the storage devices. Preferably, buffer 720 is organized in blocks of data. Volume LBA 705 represents the volume level data address associated with storage command 700 and is used by some command handlers, stripe and span command handlers for example. Group LBA 707 represents an offset into the current storage group, recall each storage group has its own range of LBAs ranging from zero to a maximum value. Data size 709 represents the number of blocks in buffer 720. Group pointer 711 simply references which group is current storage group through which the storage command is being processed. Command pointer 713 represents an anchor for the partition level command queue so that once the command stack has completed processing a storage command; the system can begin transmitting the partition level commands.

Storage command 700 represents any type of command targeting a storage area. Command 700 could be a read command, a write command, a check status command, or other commands that could target a logical volume or a portion of a logical volume. In a preferred embodiment, the volume level storage command originates from a file system, especially a multi-initiator file system.

Mirror command handler 725 has the responsibility for passing a volume level storage command to the command handler associated with each of a mirror group's children. Consequently, mirror command handler forms one or more storage commands as presented by storage commands 700A through 700N which are substantially duplicates of storage command 700. Storage command 700A is formed and passed to the first mirror member's command handler; and then upon return, the next storage command is formed and passed to the next mirror member's command handler, and so on until storage command 700N has been processed. Note that storage commands 700A through 700N are substantially the same because each targets an instance of the logical volume which is a property of a mirrored volume. For example, buffer pointers 703A through 703N point to the first block of data buffer 720. Also, volume LBAs 705A through 705N have the same value as volume LBA 705, a value of VLBA in this example. Furthermore, the group LBAs 707A through 707N also have the same value as volume LBA 705, a value of VLBA in this example, because each member of the mirror group has a group LBA range that is the same size or extent as the volume level LBA range. In addition, the data sizes 709A through 709N have the same value as data size 709 of storage command 700. Group pointer 711A points the group associated with the first member and group pointer 711N points the group associated with the Nth member. Also, note command pointer 713 is also propagated along with the storage commands so that when the partition level is reached, the partition command handler forms the partition level command queue by linking in the partition level commands to command pointer 713.

Mirror command handler 725 generates the volume level storage commands and calls the command handler for each of its children. When the child's command handler is called, mirror command handler 725 passes a newly generated storage command to the command handler for that child. Once the child command handler returns, the storage command sent to the child is no longer needed; and then next storage command can be formed and processed. The storage command is no longer needed because the partition command handler generates the partition command queue which stores the results of the command stack processing.

Command Handlers: Stripe Command Handlers

Figure 7B:
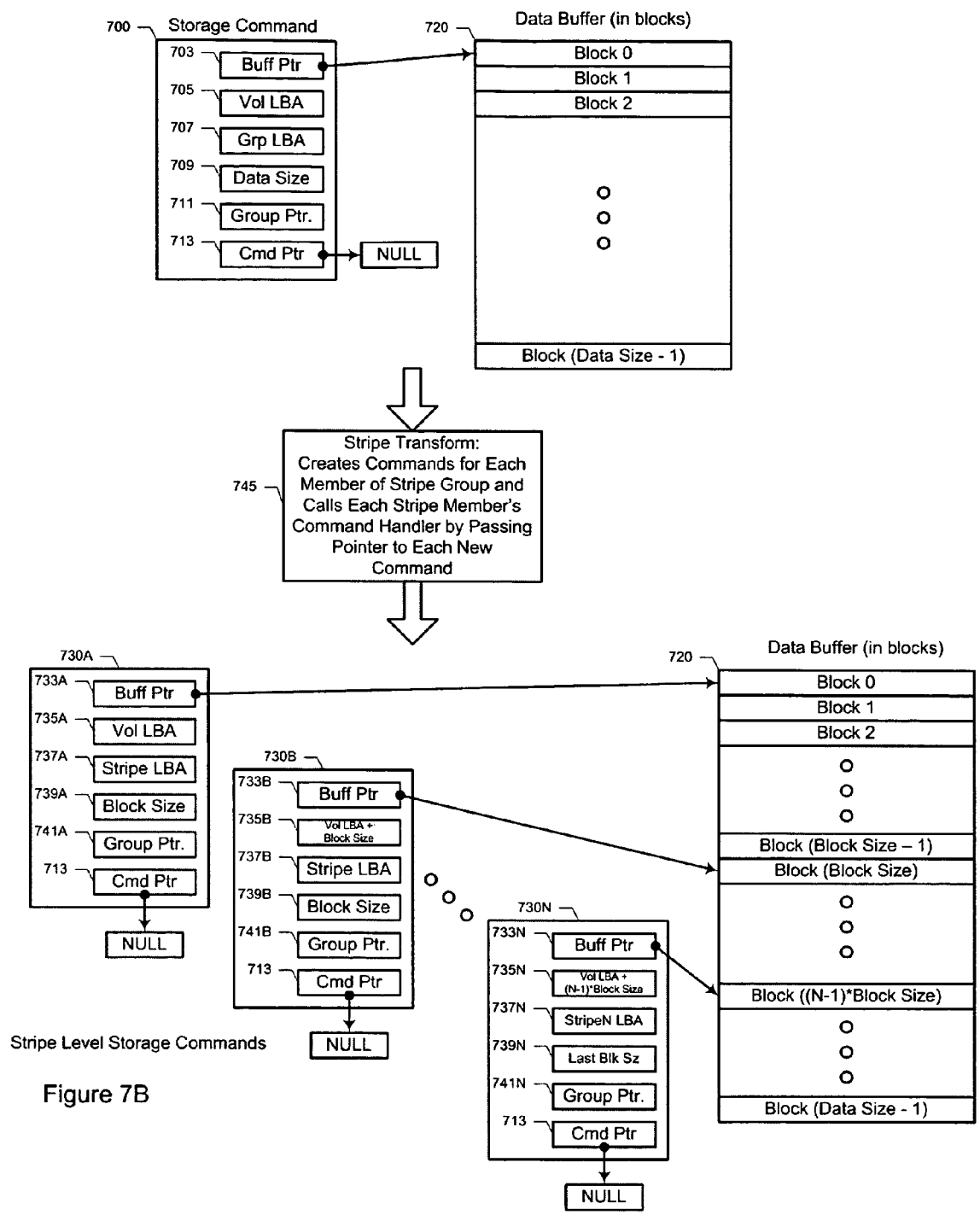
FIG. 7B illustrates an example embodiment of how a storage command is transformed into one or more stripe level storage commands.

FIG. 7B illustrates an example embodiment of how a storage command is transformed into one or more stripe level storage commands. Stripe command handler 745 operates on storage command 700 by creating one or more stripe level storage commands as indicated by storage commands 730A through 730N. In a preferred embodiment, storage command 700 could originate from a mirror command handler or could come directly from a file system in the case there are no mirrors.

Storage command handler 745 uses stripe group specific information including stripe block size and the number of striped members to form storage commands 730A, 730B through 730N to be processed by the stripe group member's command handlers. Each of stripe level command 730A, 730B through 730N represents a different storage command targeting a different storage area portion within the logical volume due to the arrangement of the stripe. Consequently, assuming data size 709 indicates there is sufficient data, storage command 730A through 730N represent data accesses across the stripe group members. One skilled in the art of RAID systems, especially striping, will recognize there are other possible data access arrangements other than the simple example presented here; all of which arrangements are contemplated.

Storage command 730A represents a first stripe level storage command associated with a stripe group member referenced by group pointer 741A. Buffer pointer 733A points to the beginning of buffer 720 because stripe command 730A is the first stripe level command to be processed. In addition, volume LBA 735A has the same value as volume LBA 705, again, because stripe storage command 730A is the first part of the data access. Group LBA 737A has a value calculated as a function of volume LBA 735A, the number of stripe members, and the stripe block size as is done with traditional striping with the exception that data is striped across storage groups as opposed to disks. The resulting value represents an offset into the stripe group member's LBA extent. Data size 739A will range from zero to the stripe block size assuming data size 709 is greater than or equal to the stripe block size. Again, command pointer 713 is passed down through the command stack to be used by the partition level command handler.

After storage command 730A is processed and its command handler returns, stripe command handler 745 forms storage command 730B and calls the command handler of the stripe group member that is next. Buffer pointer 733B points to the next stripe block sized chunk of data in buffer 720. Volume LBA 735B references the volume level LBA associated with the next stripe block of data and has a value of volume LBA 705 plus the block size. Group LBA 737B is also calculated just as in the case of group LBA 737A. In this example, the group 737B has the same value as group 737A assuming that both commands are accessing data at the same depth within the stripe. Data size 739B in this example also has a size of the stripe block size. Group pointer 741B points to the target group associated with the stripe group member and finally storage command 730B carries command pointer 713.

Stripe command handle 745 continues forming the next stripe level command and calling the next member's command handler in this fashion until the last stripe level storage command 730N is reached. Buffer pointer 733N points to the last part of buffer 720 that has a size equal or less than the stripe block size as indicated by data size 739N having a value representing the last chunk's size. Also, stripe command handler 745 calculates volume LBA 735N as a function of how many blocks are written across the stripe members. Group LBA 737N could comprise a different value group LBA 737A because it is possible that stripe command handler 745 could complete one full stripe of commands and start another round resulting in accessing data deeper into the stripe group member's LBA extents. Similarly, group pointer 741N could also point to a previously used group. Individuals familiar with striping data across multiple storage devices will appreciate the various calculations and various scenarios required for properly data striping beyond those described in this simple example, all of which are applicable to the inventive subject matter.

It is contemplated that stripe command handler 745 can be modified to perform parity calculations to provide a parity RAID handler for supporting RAID 4, RAID 5, RAID 6, or other parity configuration. Preferably a parity command handler issues a read request for the parity information, then modifies the parity value based on any write requests; and then issues write commands to the members of the parity group. In some embodiments, the additional processing for parity can be handled through proxies located on another device.

Command Handlers: Span Command Handlers

Figure 7C:
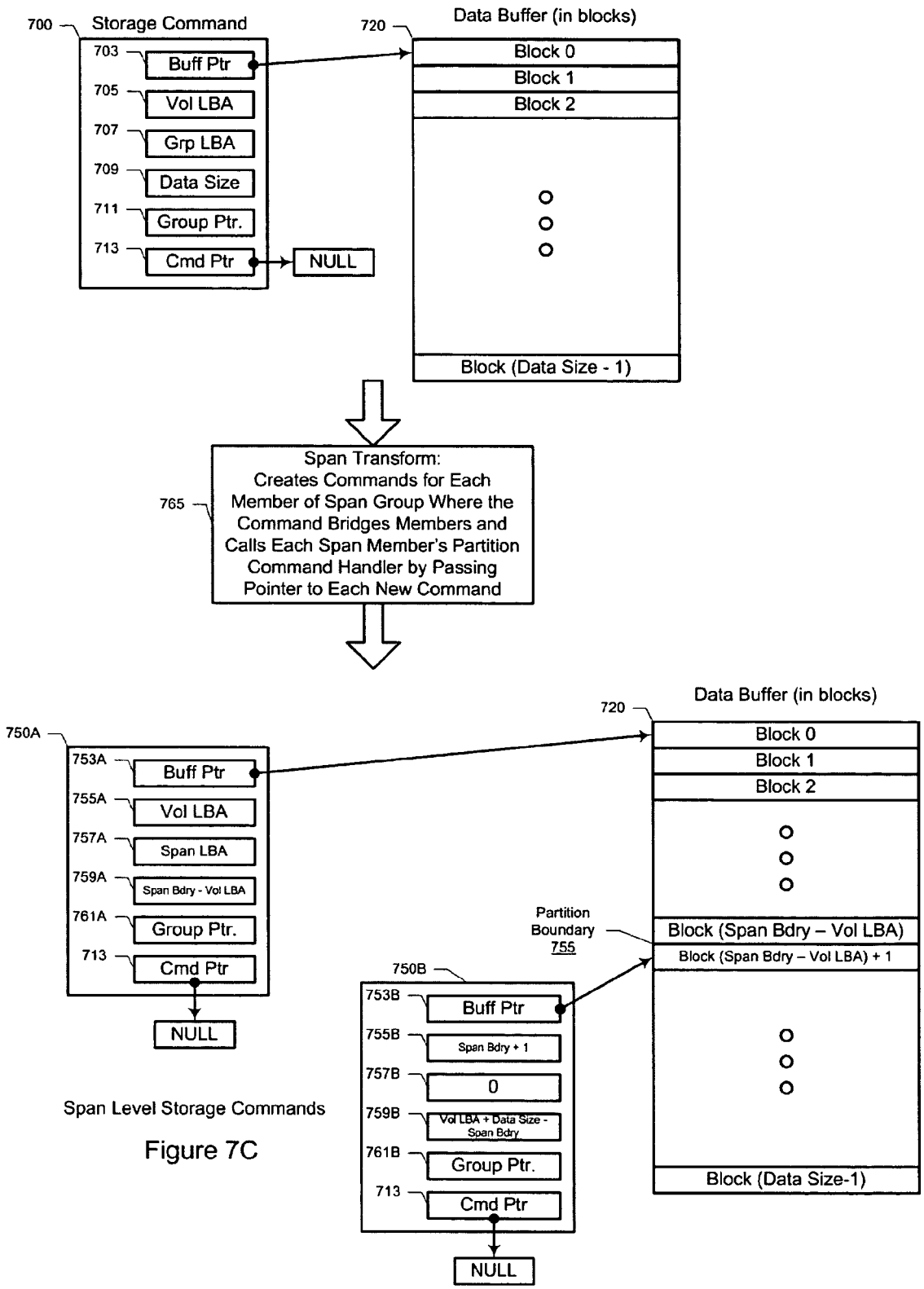
FIG. 7C illustrates an example embodiment of how a storage command is transformed into one or more span level storage commands.

FIG. 7C illustrates an example embodiment of how a storage command is transformed into one or more span level storage commands. Span command handler 765 operates on storage command 700 by transforming it into one or more span level storage commands as indicated by storage commands 750A and 750B. In a preferred embodiment, span command handler 765 can receive storage command 700 directly from a file system, from a mirror command handler, or from a stripe command handler because it is below each of these in the storage group type organization.

Span command handler 765 utilizes information regarding the LBA extents of each of its children to calculate where the span boundaries are within the span group's LBA extent. This information is then used to form storage command 750A and 750B when storage command 700 bridges partitions. Storage command 750A represents a first span level storage command accessing data from a first partition and storage command 750B represents a second span level storage command accessing data from a second partition that follows the first partition.

Storage command 750A comprises information about the first partition access. Buffer pointer 753A points to the beginning buffer 720. Volume LBA 755A is the same as volume LBA 705 because it represents the first part of the data access. Group LBA 757A has a value calculated by span handler 765 and represents an offset into the span member's group. The value is calculated from volume LBA 705 and from the extents of each of the span group member's LBA extents. Similarly, data size 759A is also calculated from the same information, specifically where span boundary is relative to volume LBA 755A. Naturally, this example assumes that the value of the span boundary is in the same map space as the volume level LBA extent. Group pointer 761A points to the partition group for which storage command 750A is targeting and, yet again, command pointer 713 is passed to the partition level command handler.

Once storage command 750A is processed, the partition command handler returns; and then span command handler 765 processes storage command 750B. Storage command 750B represents the second part of storage command 700 targeting the next partition. Buffer pointer 753B points to the place in buffer 720 where the data will bridge between partitions as indicated by partition boundary 755. Volume LBA 755B has a value of where the previous partition's span boundary was plus one. Additionally, the group LBA 757B will have a value of zero indicating that access will occur in the beginning of the partition. Data size 759B is also calculated from partition extent information including using the span boundary. Group pointer 761B points to the partition for which storage command 750B is destined.

As in the previous preferred command handlers, span command handler 765 generates storage command 750A then calls the command handler associated with group pointer 761A. Once storage command 750A is processed it is no longer needed. Span command handler 765 then proceeds to generate storage command 750B and then processes it next.

Command Handlers: Partition Command Handlers

Figure 7D:
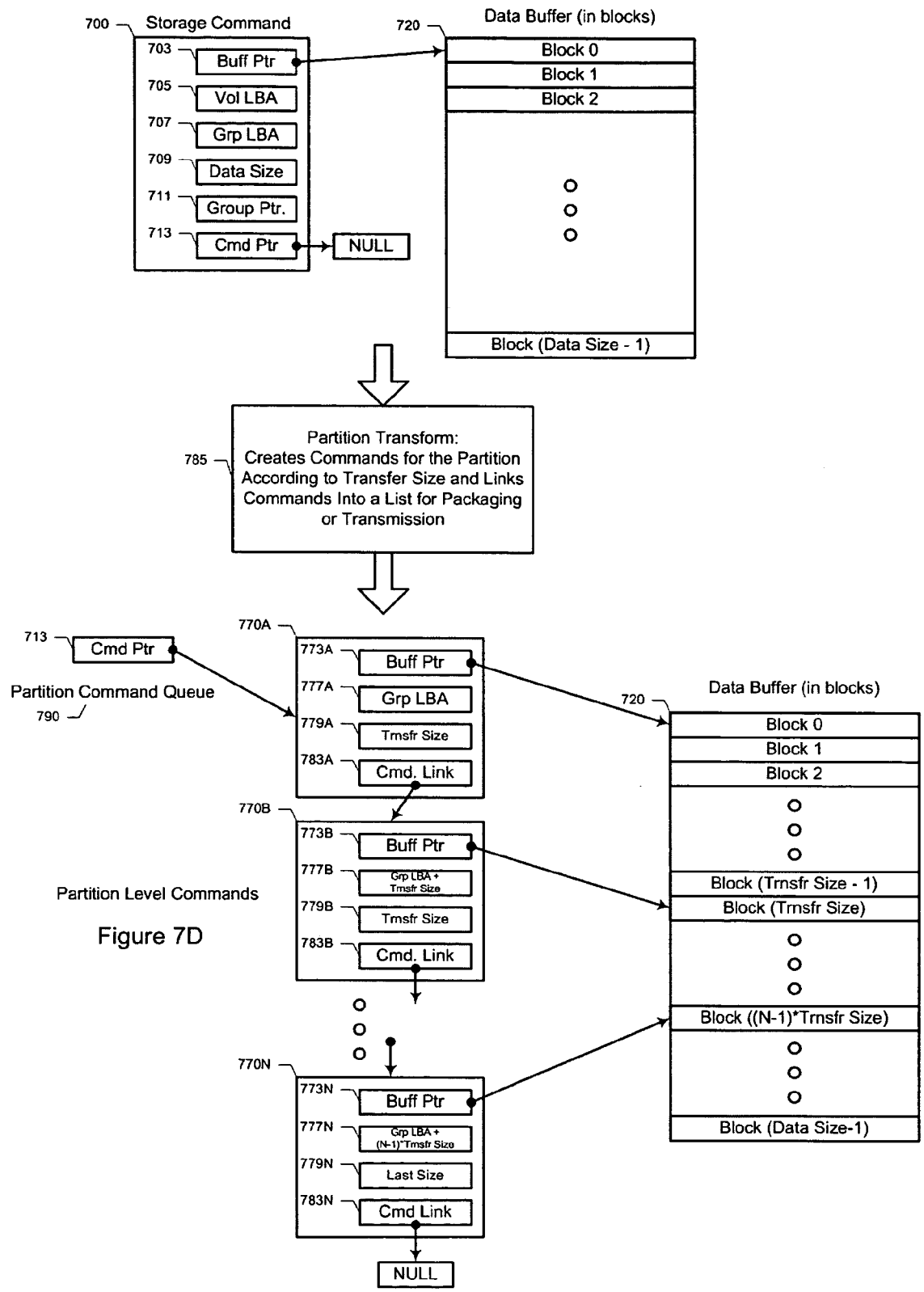
FIG. 7D illustrates an example embodiment of how a storage command is transformed into one or more partition level storage commands.

FIG. 7D illustrates an example embodiment of how a storage command is transformed into one or more partition level commands. Generating partition level commands, in the preferred embodiment, represents the bottom of the storage group hierarchy and provides the actual structure for generating partition level commands to access data targeting a storage device. Partition command handler 785 transforms storage command 700 into one or more partition level commands as represented by partition level storage commands 770A, 770B through 770N. In a preferred embodiment, partition command handler 785 forms partition command queue 790 by adding partition command 770A through 770N to a list of commands referenced by command pointer 713. This list continues to grow as a volume level storage command is completely processed through the logical volume's command stack. Preferably, storage command 700 represents a volume level storage command, a stripe level storage command, or a span level storage command given the preferred imposed hierarchy of storage groups.

Partition command handler 785 utilizes information relating to the characteristics of a partition to determine how to generate storage commands 770A through 770N. The partition commands, in a preferred embodiment, are slightly different than a generic storage command because they specifically target a storage area and are packaged or transmitted to a storage device.

The parameters associated with a partition include a data transfer size, a size of the partition in blocks, or a partition identifier. Preferred transfer sizes are in units of 512 byte blocks to match block sizes on commonly available storage devices. Especially preferred transfer sizes include 1, 2, 4, 8, 16, 32, or 64 data blocks to fit transfers within a single datagram; however, other blocks sizes are also contemplated. The partition size information is used by the command handlers to properly map high-level storage command data access to the partition. As mentioned previously, the partition identifier is used to address the specific partition. Preferably, the partition identifier is an IP address; however, LUNs or other addresses can also be used without loss of applicability. In one embodiment employing iSCSI, an IP address can be used to address a storage command to a storage device, and then a LUN is used to address a specific storage area on the storage device.

Partition command handler 785 uses the transfer size information to form each of partition command 770A through 770N which represents a single access requesting at most one transfer size of data. Partition command 770A represents a first partition command. Buffer pointer 773A points to the first part of buffer 720. Partition command 770A does not require volume LBA 707 information in its request because all volume level processing has been completed by previous layers. Group LBA 777A references the offset within the target partition and data size 779A indicates that requested data access is at least the expected transfer size of the partition. Command link 783A continues to form partition command queue 790 by linking to the next partition level command as does command link 783B. Once partition command handler 785 completes the generation of partition command 770A, it generates partition command 770B.

Partition command 770B is generated in a similar manner as partition command 770A. Buffer pointer 773B points into buffer 720 at a place that is one transfer size deep at the beginning of the next chunk of data. Group LBA 777B has a value that is one transfer size greater than the previous partition command and data size 779B again is the transfer size. Partition command handler 785 continues to generate partition commands until all of the data of buffer 720 has been handled. The last partition command represented by partition command 770N handles the trailing part of buffer 720 by having buffer pointer 773N point to the last portion of buffer 720. Group LBA 777N has a value calculated as a function of the number of chunks required to process storage command 700. Data size 779N has a value less than or equal to the transfer size of the partition. Finally, command link 783N is NULL terminated if necessary which represents the end of command queue 790.

Once a storage device receives a partition level command, the storage device translates the partition level LBA into a device level LBA associated with the physical storage device. For example, storage command 770A has associated group LBA 777A which has a value ranging from 0 to the maximum value for that target partition. However, when the storage device receives storage command 770A, it maps group LBA 777A possibly to an absolute LBA reference within an actual hard disk drive.

Command Handlers: Command Stack Processing

The command stack formed by linked storage groups and the command handlers transforms high-level storage commands into low-level storage commands that can be processed by a storage device responsible for a partition. The command stack generates the commands by mapping the high-level commands to the functionality provided by various storage group of partition. One skilled in the art of computer programming will recognize there are numerous possible embodiments for processing storage commands.

In a preferred embodiment, storage commands are passed to the command stack or to group command handlers via a pointer to a command data structure. A command data structure comprises information relating to the nature of the command including the type of request, (read, write, status, etc. . . . ), the size of the data request if any, or a pointer to buffer for holding any data. Using a pointer to a data buffer allows command handlers to treat write requests and read requests substantially in the same manner. As the command handlers transform high-level storage commands into low-level storage commands, the command handlers place the low-level storage commands in a linked list of storage commands, preferably at the partition level. The storage command list ultimately results in only a list of partition level storage commands that can be packaged and sent to storage devices. Each of the partition level storage commands in the list comprises an offset into the buffer, the request size, partition LBA, partition identifier or other information useful when packaging the partition level storage commands.

Although the command stack itself can be a complex structure, the structure only calls into a few functions; one function for each type of storage group. This implies if a logical volume supports four storage group types, mirrors, stripes, spans, or partitions; the command stack will only call four functions: the mirror command handler, the stripe command handler, the span command handler, or the partition command handler. The each group carries its defining context information within their group data structure for use by the command handlers. Developing a command stack that operates in this manner reduces the need for use of recursion which can be beneficial for embedded systems that have memory limitations.

Packaging Storage Commands

Ultimately, the low-level storage commands are packaged for transmission to the storage devices. In a preferred embodiment, the partition level commands are packaged according to a storage protocol that is understood by a storage device; however, it is also possible to package higher level storage commands and send them to other devices, including a proxy, for further command stack processing. For example, in Zetera's Z-SAN protocol, each partition level command is packaged in a UDP datagram having a Z-SAN command, data payload of the appropriate transfer size, and the IP address of the partition. A Z-SAN enabled device could have multiple IP addresses, one for each partition for which it is responsible. It uses the IP address of the Z-SAN datagram to distinguish between partitions at the IP layer. Alternatively, the partition level command can be packaged using an iSCSI protocol. Rather than using an IP address to identify a partition, iSCSI uses an IP address to address a storage device and then uses a LUN to address a partition. iSCSI also transfers the partition level command over a TCP/IP connection within an iSCSI session which could also be used to transfer a higher level storage command. One should note the method of transport of the partition level storage command or other storage commands is independent of their generation; therefore, any protocol could be used including FCIP, iFCP, SATA, ATA, SAS, SCSI, USB, wireless USB, IEEE 1394, 802.11, or other protocols that can carry a storage command.

One embodiment provides for the partition handler to package generated storage commands as opposed to linking the partition level storage commands into a linked list representing a queue of commands. Once the partition level storage commands are generated, they can be packaged into packets and sent to the partitions. This is advantageous because it provides the quickest response in the storage system; however, for a transaction protocol that expects a response to each sent command the system would block storage command processing while waiting for a response when no callbacks are provided.

In the preferred embodiment, where the partition handler queues the commands for later transmission via the linked list of partition level storage command, the partition level storage commands are packaged and sent. The advantage with this approach is that command processing is decoupled from any storage protocol processing so command generation is not interrupted by processing the storage protocol. For example, if each partition level command packaged in an iSCSI protocol requires a response from the partition or the storage device, then a partition command handler does not have to wait for a response before sending the next partition level storage command.

Constructing a Logical Volume Map

The command stack represented by the linked storage groups and the command handlers represents a map of a logical volume. In the contemplated distributed, virtual environment where clients and storage devices are expected to appear and disappear without providing notice, clients do not require a priori knowledge of the system. Preferably, clients access the storage system by discovering one or more partitions. Clients entering the system send a discovery message, possibly using a UDP broadcast, to storage devices which respond with partition information. The partition information includes attributes representing logical volume map information for use by the client. The client then is able to construct a map of the logical volume as a function of the discovered map data. For example, partitions can respond with an attribute that describes its group affiliation within the hierarchy of storage group types. An attribute, including a name for example, can include hierarchical information about the group to which the partition belongs. Clients parse the attribute information from the partitions to gain an understanding of how the partitions fit together to form the logical volume. The attribute encodes the common rule information about the storage group organization in a manner that the client can understand so it can construct the logical volume. Clients then build the command stack representing the map of the logical volume from the organizational rules and the attribute information. In some sense, the attributes can be considered instructions to the client on how to construct the command stack for the logical volume. Co-owned U.S. patent application having Ser. No. 11/205,895 titled "Disaggregated Resources and Access Methods" provides details on clients discovering partition information, hierarchical names, or use of attributes that encode the storage group organization.

As a client interprets attribute information while building the logical volume command stack, it is advantageous to use optional parent pointers or optional pervious peer pointers. Using these pointers provides for walking the group structure to ensure there are no holes or errors.

It is contemplated that storage areas in the virtual storage system respond to a discovery request individually or collectively. An individual response represents a single response from each partition where the response comprises the partition information. A collective response represents a response from an element in the system that comprises information relating to multiple partitions. In some embodiments, a proxy will aggregate individual responses from many partitions and then respond to a client discovery with an individual response as if it were a single storage area. For example, if the proxy aggregates a striped storage group, the proxy can treat the striped storage group as if it were a single partition and present a discovery response to a client as if the group where an individual partition. In other embodiments, a storage device or other device collects information about the partitions and then forms a message comprising information for multiple partitions. For example, a single storage device could respond to a discovery request with a message comprising the name or attributes of each individual partition.

The resulting command stack can be simple or complex. A simple command stack represents a command stack using a single command handler for all storage groups within the logical volume. For example, a logical volume that maps directly to a partition would only require a partition command handler. A complex command stack includes multiple command handlers for different types of storage groups including a mirror, stripe, span, partition, parity, or other mix of command handlers.

Updating a Logical Volume Map

The logical volume map comprises the linked structure of storage groups. As in any linked list, members can be updated by adjusting the pointers in the list. Some storage groups can be added to the logical volume by linking in the additional storage groups, or can be removed from the logical volume removed by de-linking storage groups.

An example of adding storage groups includes increasing the capacity of a logical volume by adding additional partitions to the logical volume. If a logical volume comprises only a span group having three members, for example, the logical volume could have its capacity increased by linking in a fourth member to the peer links of the span group. A client would now perceive the logical volume as having increased capacity without having to dismount the logical volume.

An example of removing storage groups includes handling lost partitions. If a volume comprises a mirror group having more than one member, then each member represents an instance of the logical volume. When a client can no longer access a partition associated with one member, the client can still access data from one or more partitions of the other mirror group members. The client can update the logical map by removing the links to the lost partition or any groups it is associated with by NULL terminating the peer links or child links. The command stack is still valid and processes storage commands normally; however, the command stack simply does not encounter the removed storage groups. It is contemplated that a client includes instructions to determine if the client should continue writing to a broken mirrored volume or not.

In a preferred embodiment, clients obtain partition information regarding the coherency of a logical volume with respect to the data. Coherency refers to the client being able to access a complete instance of a logical volume as represented by the logical volume's range of LBAs even though parts of the logical volume might not be accessible. In one embodiment, the client periodically probes the system for the attributes of the partition to ensure the partitions associated with the logical volume are available. When a client detects a change in the structure of the logical volume through analyzing the attribute information, it can update the map of the logical volume by adding or removing appropriate storage groups.

Once a client has formed a coherent logical volume map with respect to the LBA range, it can mount the logical volume as a locally attached storage device. In a preferred embodiment, when the client detects changes in the logical volume, it updates the logical volume map without dismounting it. The client is not required to dismount the logical volume because storage groups can be linked or de-linked without affecting the operating system or the file system.

Additional Considerations

Although the preferred embodiment packages partition level storage command for transmission to a storage device, the astute reader will recognize that there is little difference between a partition level storage command and a higher level storage command with respect to packaging. Therefore, the inventive subject matter also includes the concept of packaging any level storage command for transmission to a storage device or to a storage area on the storage device. Such an approach provides for establishing a distributed command stack where command handlers can operate across a communication link connecting a client, a proxy, a storage device, or other devices that could house command handlers within their memories. A proxy represents a device that appears as one or more single storage area to another device while aggregating one or more storage areas from other storage devices. The proxy acts as a client with respect to a storage device; however, it also acts like a storage device with respect to a client.

In a very real sense, a storage group organization coupled with command handlers that operate on storage commands associated with a type of storage group can be considered a "math" that describes LBA transformations. Command handlers represent various operators that accept an LBA and a data request size as an input. The command handlers then output one or more transformed LBAs and data request sizes. Consequently, all command handlers that transform data addresses and request sizes are contemplated. For example, the inventive subject matter provides for adding capabilities within a command handler to reflect additional functionality for a type of storage group. Command handlers are sufficiently divorced from the structure of a logical volume that modifications to the command handler functionality do not change the topology of the logical volume. Modifying stripe command handlers to handle parity represents one example.

Another example includes modifying mirror command handlers to enhance the performance of the logical volume. A logical volume having a mirror group that includes two or more members comprises more than one set of the logical volume's data as accessed through more than one set of LBAs. Therefore, a mirror command handler can be modified to spread read storage commands across mirror group members. As the mirror command handler processes volume level read commands, it can rotate the storage commands or portions of the storage commands through each mirror member to distribute the load across multiple storage devices. When the partitions associated with the mirror members are located on different storage devices, the read performance will be greater than reading data from mirror members located on the same storage device. In one embodiment, a modified mirror command handler treats the data on the mirror members as if the mirror group members belong to a striped group. Such an approach can be advantageously deployed in clients having internal storage devices including a computer with two hard disks where one disk mirrors the other. Additionally, command handlers could differentiate between types of requests. For example a command handler could process write or read requests differently to gain additional functionality.

The structures disclosed in this document can be applied to other technologies beyond storage. The concepts can be generalized to offer command processing for distributed or for disaggregated devices. Clients can discover the structure of a disaggregate device, and then form a command stack based on the discovery information. In other embodiments a client could use information from a server to construct a communication stack to ensure only the necessary communication infrastructure is used. For example, if a client and sever are connected on the same Ethernet LAN, it is conceivable the client could create a communication stack from server instructions that only employs Ethernet rather than a full TCP/IP stack for communication for efficient communication. Such a command stack would be well suited for atomic, command-response application protocols.

Chaining command stacks together is also contemplated. As mentioned previously, command stacks can be spread among clients, proxies, storage devices, or other elements within the storage system. This includes the concept where a client interacts with a storage device which itself employs a command stack to access further storage capabilities. For example, a client could perceive a logical volume comprising a span group of partitions. However, each partition is actually a RAID-5 stripe group within a storage device. The storage device uses a RAID-5 command handler to interact with local partitions, while the client uses a span command handler to interact with the partition on the storage devices. Essentially, the span level command are sent to the storage device which treats them as a high-level command and further processes them through the RAID-5 command handler.

Each storage device can treat each partition as a storage area having LBA range from 0 to the storage area's maximum LBA because the partition's LBA range is independent of the storage group's range. This provides fast processing on the storage device as opposed to requiring the storage device to perform additional calculations. In addition, this implies storage devices do not require the ability to understand how to operate according to the rules of the storage group organization. When partitions are instantiated, their names or attributes are updated to carry the rule information used by clients to construct the logical volume maps. The partitions simply store data in a linear range of LBAs.

Advantages

A number of advantages are realized through the use of generating storage commands from a logical volume map comprising command handlers. In systems where each client functions independently of each other, each client establishes its own view of the logical volume, although each of the clients has substantially the same map because all clients employ the same common rules for constructing the logical volume. When one client looses visibility of a portion of the logical volume causing its map to be updated, the other clients are not affected. In addition, in scenarios where a logical volume comprises a mirror group having two or more members, a client can retain a coherent view of the data on the logical volume even when a portion of a mirrored member is no longer accessible. As long as a complete data set or volume level range of LBAs are available even through different mirror group members, clients retain the ability to access data. Only the groups or partitions that are no longer accessible are removed from the map by de-linking them from the logical volume map without requiring a remount of the logical volume.

Storage systems employing the disclosed techniques scale to larger deployments having many storage devices or many clients. As mentioned previously, each client functions independently and is able to participate without burdening the storage device. The system scales to the limits of the communication link bandwidth between the clients and the storage devices. In addition, the logical volume command stack can be extended out of a single host into other devices. For example, a client could have part of the command stack which then calls into a command stack located on a proxy device that continues generation of storage commands, possibly using web services to execute remote functions. The method disclosed are independent of the protocols used for transporting the storage command which provides for adoption by proprietary storage implementations as well as standards based implementations including iSCSI.

Use of command handlers associated with storage group types provides for heterogeneous mix of storage group types. As described previously mirrors, stripes, span or partitions can combine in different ways to create a single logical volume. Coupling a heterogeneous mix of storage groups with the ability of command handlers to treat types of requests differently provides for establishing logical volumes having specialized characteristics. For example, a logical volume comprising a stripe group and a span group might preferentially read from the stripe group while writing to both groups where the span group might be used for archival purposes.

Furthermore, because a logical volume command stack generates storage commands that are independent of the storage command transport, it is possible to support a heterogeneous mix of transport protocols where each protocol targets a different type of storage devices. In one embodiment, for example, a single logical volume could comprise partitions located on direct attached devices accessed through an internal controller or partitions located on remote devices accessed through network storage protocols. Partition command handlers could be adapted to handle the specific details of each type of protocol. A specific example embodiment could include a logical volume comprising partitions on a direct attached SATA hard disk drive, partitions accessed through iSCSI, and partitions accessed through Zetera's Z-SAN protocol.

Clients generate storage commands quickly because logical volume maps are constructed according to the rules associated with the organization of the storage group types. In the preferred embodiment, a high-level volume command is transformed into one or more partition level commands within at most four levels of command handlers without using recursion. This provides for fast processing of storage commands.

Hardware

Other aspects relate to hardware associated with the inventive subject matter. It is contemplated that one could develop hardware for storing, prototyping, manufacturing, manipulating, managing, packaging, testing, physically controlling or supporting, or for other activities associated with the physical aspects of the inventive subject matter. Therefore, the inventive subject matter includes systems, methods, or apparatus for developing, producing, manufacturing, or running the hardware. In this sense, the hardware falls within the scope of the inventive subject matter.

Software

In still another aspect, it is contemplated that one could write software that would configure, simulate, or manage various aspects of the inventive subject matter and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Thus, specific compositions and methods of generating storage commands have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A storage system comprising:
a plurality of storage partitions;
a plurality of storage groups, the individual storage groups being associated with a selected one of a plurality of group types that are hierarchically organized; and
access logic to access the plurality of storage partitions by employing a map of a logical volume that links the plurality of storage groups together, wherein the map includes a group data structure that represents a storage group of the plurality of storage groups, the storage group being a first child of a parent storage group, the group data structure having a function pointer configured to point to a command handler for a first group type with which the storage group is associated, a peer group pointer configured to point to a peer storage group of the storage group, the peer storage group being a second child of the parent storage group, and a child group pointer configured to point to a child storage group of the storage group, the child storage group being associated with a second group type, which is hierarchically organized below the first group type.

2. The storage system of claim 1, wherein the peer storage group is associated with a third group type, which is hierarchically organized below the first group type.

3. The storage system of claim 1, wherein the storage group has a plurality of peer storage groups, which includes the peer storage group, and the group data structure includes only one peer group pointer, the only one peer group pointer being the peer group pointer, and the peer group pointer being configured to only point to the peer storage group.

4. The storage system of claim 1, wherein the storage group has a plurality of child storage groups, which includes the child storage group, and the group data structure includes only one child group pointer, the only one child group pointer being the child group pointer, and the child group pointer being configured to only point to the child storage group.

5. The storage system of claim 1, further comprising:
a command handler for each of the plurality of group types.

6. The storage system of claim 1, wherein each of the plurality of storage partitions are associated with a storage group having a partition group type, the partition group type being the lowest hierarchically organized group type.

7. The storage system of claim 6, further comprising:
a storage device including at least two storage partitions of the plurality of storage partitions.

8. The storage system of claim 1, wherein the access logic comprises a command handler configured to receive a first command directed to the storage group and to generate, based at least in part on the first command, a second command directed to the child storage group.

9. The storage system of claim 8, wherein the access logic further employs:
   another data structure representing the child storage group and having parameters for the second group type, and
   the command handler being configured to generate the second command based at least in part on the parameters.

10. The storage system of claim 8, wherein command handler is further configured to sequentially generate a plurality of second commands, which includes the second command, based at least in part on the first command.

11. An apparatus, comprising:
   a communication interface configured to couple the apparatus to a storage system; and
   a controller coupled to the communication interface and configured
      to receive partition information from a storage device via the communication interface; and
      to construct, based at least in part on the partition information, a map of a logical volume that links a plurality of storage groups together, wherein the map includes a group data structure that represents a storage group of the plurality of storage groups, the storage group being a first child of a parent storage group, the group data structure having a function pointer configured to point to a command handler for a first group type with which the storage group is associated, a peer group pointer configured to point to a peer storage group of the storage group, the peer storage group being a second child of the parent storage group, and a child group pointer configured to point to a child storage group of the storage group, the child storage group being associated with a second group type, which is hierarchically organized below the first group type.

12. The apparatus of claim 11, wherein the peer storage group is associated with a third group type, which is hierarchically organized below the first group type.

13. The apparatus of claim 11, wherein the storage group has a plurality of peer storage groups, which includes the peer storage group, and the group data structure includes only one peer group pointer, the only one peer group pointer being the peer group pointer, and the peer group pointer being configured to only point to the peer storage group.

14. The apparatus of claim 11, wherein the storage system comprises a plurality of storage partitions that are to be accessed through the plurality of storage groups, with each of the plurality of storage partitions being associated with a partition group type that is hierarchically organized among the group types as the lowest group type.

15. The apparatus of claim 14, wherein the controller is further configured to
   access the plurality of storage partitions based at least in part on the map.

16. A method comprising:
   receiving, by a client device, partition information from a storage device via the communication interface; and
   constructing, by the client device, based at least in part on the partition information, a map of a logical volume that links a plurality of storage groups together, wherein the map includes a group data structure that represents a storage group of the plurality of storage groups, the storage group being a first child of a parent storage group, the group data structure having a function pointer configured to point to a command handler for a first group type with which the storage group is associated, a peer group pointer configured to point to a peer storage group of the storage group, the peer storage group being a second child of the parent storage group, and a child group pointer configured to point to a child storage group of the storage group, the child storage group being associated with a second group type, which is hierarchically organized below the first group type.

17. The method of claim 16, wherein a plurality of storage partitions are each associated with a storage group having a partition group type that is hierarchically organized among the group types as the lowest group type and the method further comprises:
   accessing the plurality of storage partitions based at least in part on the volume map.

18. The method of claim 16, further comprising:
   receiving, with the command handler, a first command directed to the storage group; and
   generating, based at least in part on the first command, a second command directed to the child storage group.

19. The method of claim 18, further comprising:
   receiving, with the command handler, parameters for the second group type, and
   generating the second command based at least in part on the parameters.

20. An article of manufacture comprising:
   a computer readable storage medium; and
   a plurality of instructions stored in the computer readable storage medium, and configured to program an apparatus to enable the apparatus to practice a storage access method that includes
      receiving partition information from a storage device via the communication interface;
      construct, based at least in part on the partition information, a map of a logical volume that links a plurality of storage groups together, wherein the map includes a group data structure that represents a storage group of the plurality of storage groups, the storage group being a first child of a parent storage group, the group data structure having a function pointer configured to point to a command handler for a first group type with which the storage group is associated, a peer group pointer configured to point to a peer storage group of the storage group, the peer storage group being a second child of the parent storage group, and a child group pointer configured to point to a child storage group of the storage group, the child storage group being associated with a second group type, which is hierarchically organized below the first group type; and
   accessing the plurality of storage groups using the volume map.

21. The article of claim 20, wherein the instructions further enable the apparatus to practice the storage access method that includes
   receiving, with the command handler, a first command directed to the storage group; and
   generating, based at least in part on the first command, a second command directed to the child storage group.

22. The storage system of claim 1, further comprising:
   a first storage device having a first partition of the plurality of partitions, the first partition being a member of the storage group;
   a second storage device having a second partition of the plurality of partitions, the second partition being a member of another storage group of the plurality of storage groups; and the command handler configured to transform a first storage command associated with the storage group to a second storage command associated with the another storage group.

23. A method of generating a storage command for a storage system having a logical volume that includes a first partition located on a first storage device and a second partition located on a second storage device, the method comprising:

provviding a map of the logical volume wherein the map includes a first group data structure associated with a first storage group, of a first storage group type, to which the first partition is a member; and a second group data structure associated with a second storage group, of a second storage group type, to which the second partition is a member;

incorporating a first and second command handler for the first and second storage group types, respectively, into the first group data structure and the second group data structure of the map; and transforming, with the first command handler, a first storage command associated with the first storage group to a second storage command associated with the second storage group, the second storage command including an internet protocol (IP) address as a partition identifier.

24. The method of claim 23, further comprising updating at least a portion of the map upon detecting a change in the logical volume structure.

25. The method of claim 24, further comprising performing the update of the map while keeping the logical volume mounted.

26. The method of claim 23 further comprising translating a volume level data address associated with the first storage command to a partition data address associated with the first partition by using the first command handler.

27. The method of claim 23 wherein the first command handler and the second command handler form a command stack.

28. The method of claim 23 wherein the second storage group type is hierarchically organized below the first storage group type.

* * * * *